(12) United States Patent
Han et al.

(10) Patent No.: US 10,785,825 B2
(45) Date of Patent: Sep. 22, 2020

(54) DATA TRANSMISSION METHOD, ACCESS NETWORK DEVICE, TERMINAL, AND COMMUNICATIONS SYSTEM

(71) Applicant: HUAWEI TECHNOLOGIES CO., LTD., Shenzhen, Guangdong (CN)

(72) Inventors: Lifeng Han, Shenzhen (CN); Qufang Huang, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/581,151

(22) Filed: Sep. 24, 2019

(65) Prior Publication Data

US 2020/0022213 A1      Jan. 16, 2020

Related U.S. Application Data

(63) Continuation of application No. PCT/CN2018/080396, filed on Mar. 24, 2018.

(30) Foreign Application Priority Data

Mar. 24, 2017    (CN) .......................... 2017 1 0183306

(51) Int. Cl.
*H04W 80/10*    (2009.01)
*H04W 76/12*    (2018.01)
(Continued)

(52) U.S. Cl.
CPC ........... *H04W 80/10* (2013.01); *H04L 1/1642* (2013.01); *H04W 28/0268* (2013.01);
(Continued)

(58) Field of Classification Search
CPC  H04L 1/1642; H04W 28/0268; H04W 28/10; H04W 76/10; H04W 76/12;
(Continued)

(56) References Cited

U.S. PATENT DOCUMENTS

2009/0129342 A1   5/2009  Hwang et al.
2009/0316664 A1* 12/2009  Wu ........................ H04W 76/19
                                                                370/336
(Continued)

FOREIGN PATENT DOCUMENTS

CN           103945470 A      7/2014

OTHER PUBLICATIONS

Ericsson, "Lossless inter-RAT handover with 5GC," 3GPP TSG-RAN WG2 #97, Tdoc R2-1700877; Athens, Greece, XP051211657, Feb. 13-17, 2017, 4 pages.

(Continued)

*Primary Examiner* — Rownak Islam
(74) *Attorney, Agent, or Firm* — Fish & Richardson P.C.

(57) ABSTRACT

This application provides a data transmission method. In the method, a first access network device and a second access network device establish a data radio bearer (DRB)-based tunnel and a session-based tunnel. The second access network device sends a Packet Data Convergence Protocol (PDCP) layer data packet to the first access network device via the DRB-based tunnel; and the second access network device sends a Service Data Adaptation Protocol (SDAP) layer data packet to the first access network device via the session-based tunnel.

22 Claims, 9 Drawing Sheets

(51) Int. Cl.
*H04L 1/16* (2006.01)
*H04W 28/02* (2009.01)
*H04W 28/10* (2009.01)
*H04W 36/22* (2009.01)
*H04W 72/12* (2009.01)
*H04W 76/10* (2018.01)

(52) U.S. Cl.
CPC .......... *H04W 28/10* (2013.01); *H04W 36/22* (2013.01); *H04W 72/1263* (2013.01); *H04W 76/12* (2018.02); *H04W 76/10* (2018.02)

(58) Field of Classification Search
CPC ..... H04W 80/10; H04W 36/10; H04W 36/22; H04W 72/1263
USPC ......................................................... 370/329
See application file for complete search history.

(56) References Cited

U.S. PATENT DOCUMENTS

| 2013/0301439 | A1* | 11/2013 | Heo ........................ H04W 4/90 370/252 |
| 2018/0083688 | A1* | 3/2018 | Agiwal ................ H04W 76/19 |
| 2019/0320476 | A1* | 10/2019 | Wang ................ H04W 28/0268 |
| 2019/0357075 | A1* | 11/2019 | Van Der Velde ........................... H04W 28/0268 |

OTHER PUBLICATIONS

Ericsson, "Lossless PDCP SN reconfiguration at HO," 3GPP TSG-RAN WG2 #97, R2-1700840; Athens, Greece, XP051223017, Feb. 13-17, 2017, 3 pages.
Extended European Search Report issued in European Application No. 18770178.4 dated Feb. 27, 2020, 10 pages.
Huawei et al., "QoS Flow to DRB Mapping," 3GPP TSG-RAN2 Meeting #97, R2-1701205, Revision of R2-1700088; Athens, Greece, XP051223422, Feb. 13-17, 2017, 6 pages.
Samsung, "QOS Aspect in case of Xn mobility," 3GPP TSG-RAN WG3 #Ad-hoc, R3-170041; Spokane, USA, XP051204226, Jan. 17-19, 2017, 3 pages.
Zte et al., "Further discussion on the new UP protocol layer for QoS," 3GPP TSG-RAN WG2 Meeting #97, R2-1701119; Athens, Greece, XP051211831, Feb. 13-17, 2017, 7 pages.
ZTE Microelectronics, "Further discussion on the new UP protocol layer for QoS." 3GPP TSG-RAN WG2 Meeting #97 Athens, Greece, R2-1701119, Feb. 13-17, 2017, 7 pages.
Samsung,"QOS Aspect in case of Xn mobility," 3GPP TSG-RAN WG3 #Ad-hoc,Spokane, USA, R3-170041, Jan. 17-19, 2017, 3 pages.
ITRI, "Discussion on QoS flow ID." 3GPP TSG-RAN WG2 NR Ad Hoc Spokane, USA, R2-1700255, Jan. 17-19, 2017, 3 pages.
Nokia, "Alcatel-Lucent Shanghai Bell, QoS flow relocation." 3GPP TSG-RAN WG2 Meeting #97 Athens, Greece, R2-1700814, Feb. 13-17, 2017, 3 pages.
Office Action issued in Chinese Application No. 201810825692.1 dated Jun. 20, 2019, 5 pages.

* cited by examiner

DATA TRANSMISSION METHOD, ACCESS NETWORK DEVICE, TERMINAL, AND COMMUNICATIONS SYSTEM

CROSS-REFERENCE TO RELATED APPLICATIONS

This application is a continuation of International Application No. PCT/CN2018/080396, filed on Mar. 24, 2018, which claims priority to Chinese Patent Application No. 201710183306.9, filed on Mar. 24, 2017. The disclosures of the aforementioned applications are hereby incorporated by reference in their entireties.

TECHNICAL FIELD

This application relates to the field of wireless communications, and in particular, to a data transmission method, an access network device, a terminal, and a communications system.

BACKGROUND

With the continuous increase in user requirements, more in-depth research is made on a new radio access network (New RAN). The new radio access network can provide a shorter delay and higher bandwidth and support a larger quantity of connections than an existing wireless communications system, to meet growing mobile communication requirements.

In the new radio access network, quality of service (quality of service, QoS) management is based on a flow (flow) and includes: establishing a protocol data unit (protocol data unit, PDU) session between an access network device and a core network, where the PDU session may include a plurality of flows, and different flows may have different QoS requirements; providing, by the core network, a QoS requirement of a flow for the base station; and completing, by the base station, mapping from the flow to a data radio bearer (data radio bearer, DRB) based on the QoS requirement. For example, the base station maps flows having a same QoS requirement to a same DRB and transmits the flows on the DRB.

During data transmission between base stations, for example, in a handover (handover) or dual connectivity (dual connection, DC) scenario, a tunnel is established between a source base station and a target base station, a terminal data packet on the source base station is sent to the target base station, and then the target base station communicates with a terminal. Because the target base station and the source base station may configure different mapping relationships between a flow and a DRB, the terminal data packet may be lost or repeatedly transmitted or the like when being sent to the target base station or being subsequently transmitted over an air interface. As a result, communication continuity of the terminal is affected.

SUMMARY

Embodiments of this application provide a data transmission method, an access network device, a terminal, and a communications system.

According to a first aspect, an embodiment of this application provides a data transmission method, including:

receiving, by a first access network device, forwarded data packets from a second access network device; mapping, by the first access network device to a first data radio bearer (data radio bearer, DRB), a data packet in the forwarded data packets that includes no flow identifier, where the first DRB is corresponding to a DRB of the second access network device; and mapping, by the first access network device to a second DRB based on a second mapping relationship, a data packet in the forwarded data packets that includes a flow identifier, where the second mapping relationship is a mapping relationship between a flow and a DRB in the first access network device.

The first DRB and the DRB of the second access network device each meet a first mapping relationship, and the first mapping relationship is a mapping relationship between a flow and a DRB in the second access network device. The first DRB is a reflect DRB of the DRB of the second access network device.

The forwarded data packets include at least one type of the following data packets: a Packet Data Convergence Protocol (packet data convergence protocol, PDCP) layer data packet that is of the second access network device, to which a sequence number is allocated, and for which no reception acknowledgement is obtained from a terminal; a PDCP layer data packet that is of the second access network device and to which no sequence number is allocated; and a Service Data Adaptation Protocol (service data adaptation protocol, SDAP) layer data packet of the second access network device.

On a premise that each access network device can independently set a mapping relationship between a flow and a DRB, the data packet that has a flow identifier is mapped to the second DRB for transmission, and the data packet that has no flow identifier is mapped to the first DRB for transmission. Therefore, a data packet transmission manner can be selected based on an actual network status, to avoid the following problem: In a handover or dual connectivity or another scenario, a data packet is lost or is repeatedly transmitted because each access network device independently configures a mapping relationship between a flow and a DRB. This improves terminal service continuity and improves communication quality.

In a possible implementation, the first access network device sends, to the terminal on the first DRB, a data packet in the forwarded data packets that includes no flow identifier and to which a sequence number is allocated; and the first access network device sends, to the terminal on the second DRB, a data packet in the forwarded data packets that includes a flow identifier and to which no sequence number is allocated. The data packet may be a PDCP layer data packet, and therefore the sequence number is a PDCP layer sequence number.

In a possible implementation, the first access network device sends, to the terminal on the first DRB, a data packet in the forwarded data packets that includes no flow identifier; and the first access network device sends, to the terminal on the second DRB, a data packet in the forwarded data packets that includes a flow identifier. The data packet that includes a flow identifier may be a PDCP layer data packet to which a flow identifier is allocated, and/or an SDAP layer data packet.

In a possible implementation, the method further includes: routing, by the first access network device to the second DRB via an SDAP entity, the data packet in the forwarded data packets that includes a flow identifier.

In a possible implementation, the receiving, by a first access network device, forwarded data packets from a second access network device includes: receiving, by the first access network device, the forwarded data packets from the second access network device via a tunnel established based on a DRB and a tunnel established based on a session, where the tunnel established based on a DRB is used to transmit a PDCP layer data packet that is of the second access network device and to which a sequence number is allocated; and the tunnel established based on a session is used to transmit the SDAP layer data packet of the second access network device, and/or is used to transmit a PDCP layer data packet that is of the second access network device, that includes a flow identifier, and to which no sequence number is allocated.

In a possible implementation, the receiving, by a first access network device, forwarded data packets from a second access network device includes: receiving, by the first access network device, the forwarded data packets from the second access network device via a tunnel established based on a DRB. There may be one or more tunnels established based on a DRB. For example, when there are two tunnels established based on a DRB, one tunnel may be used to transmit the data packet that has a flow identifier, and the other tunnel may be used to transmit the data packet that has no flow identifier.

In a possible implementation, the receiving, by a first access network device, forwarded data packets from a second access network device includes: receiving, by the first access network device from the second access network device via a tunnel established based on a session, the data packet in the forwarded data packets that includes a flow identifier. Optionally, the first access network device routes, to the first DRB via the SDAP entity, a PDCP layer data packet that is received from the tunnel established based on a session and to which a sequence number is allocated, and routes, to the second DRB, a PDCP layer data packet to which no sequence number is allocated or the SDAP layer data packet.

The foregoing various tunnel establishment manners are applicable to a plurality of forwarded data packet transmission scenarios. A forwarded data packet that includes a flow identifier, a forwarded data packet that includes no flow identifier, a forwarded data packet to which a sequence number is allocated, and a forwarded data packet to which no sequence number is allocated all can be transmitted via suitable tunnels. Therefore, a packet loss or repeated packet transmission in a data forwarding process is avoided, and network performance is improved.

In a possible implementation, after sending of the forwarded data packet mapped to the first DRB is completed, the method further includes: releasing, by the first access network device, the first DRB, to save a system resource.

In a possible implementation, the first access network device may send the second mapping relationship to the second access network device, and send the second mapping relationship to the terminal via the second access network device.

According to a second aspect, an embodiment of this application provides a data transmission method, including: receiving, by a first access network device, forwarded data packets from a second access network device; and mapping, by the first access network device to a first DRB, at least one data packet in the forwarded data packets that includes a flow identifier, where the first DRB is corresponding to a DRB of the second access network device.

The first DRB and the DRB of the second access network device each meet a first mapping relationship, and the first mapping relationship is a mapping relationship between a flow and a DRB in the second access network device.

The forwarded data packets include at least one type of the following data packets: a PDCP layer data packet that is of the second access network device, to which a sequence number is allocated, and for which no reception acknowledgement is obtained from a terminal; a PDCP layer data packet that is of the second access network device and to which no sequence number is allocated; and an SDAP layer data packet of the second access network device.

In a possible implementation, the method further includes: mapping, by the first access network device to the first DRB, a data packet in the forwarded data packets that includes no flow identifier.

In a possible implementation, the method further includes: mapping, by the first access network device to a second DRB based on a second mapping relationship, at least one data packet in the forwarded data packets that includes a flow identifier and that is other than the data packet mapped to the first DRB, where the second mapping relationship is a mapping relationship between a flow and a DRB in the first access network device.

In a possible implementation, the first access network device sends the forwarded data packets to the terminal on the first DRB or on the first DRB and the second DRB.

Optionally, in the second aspect, different types of tunnels may be established between the first access network device and the second access network device to transmit the forwarded data packets. For an example of a specific tunnel type, refer to the related descriptions in the first aspect. Details are not described again. Various tunnel establishment manners are applicable to a plurality of forwarded data packet transmission scenarios. A forwarded data packet that includes a flow identifier, a forwarded data packet that includes no flow identifier, a forwarded data packet to which a sequence number is allocated, and a forwarded data packet to which no sequence number is allocated all can be transmitted via suitable tunnels. Therefore, a packet loss or repeated packet transmission in a data forwarding process is avoided, and network performance is improved.

In a possible implementation, the method further includes: sending, by the first access network device to the terminal on the first DRB, a PDCP layer data packet that is in the forwarded data packets and to which a sequence number is allocated; and sending, by the first access network device to the terminal on the second DRB, a PDCP layer data packet that is in the forwarded data packets and to which no sequence number is allocated.

In a possible implementation, after sending of the forwarded data packets mapped to the first DRB is completed, the method further includes: releasing, by the first access network device, the first DRB.

In a possible implementation, the first access network device may send the second mapping relationship to the second access network device, and send the second mapping relationship to the terminal via the second access network device.

According to the data transmission method provided in this embodiment of this application, the first access network device sends the forwarded data packets to the terminal on the first DRB corresponding to the second access network device. Further, to obtain better network performance, the first access network device establishes the second DRB. The second DRB is used to transmit the data packet in the forwarded data packets that has a flow identifier and that is other than the data packet mapped to the first DRB, and the second DRB meets the mapping relationship that is between a flow and a DRB and that is configured by the first access network device. Therefore, the forwarded data packets can be transmitted in various flexible transmission manners on different DRBs, and a data packet transmission manner can be selected based on an actual network status, to avoid the following problem: In a handover or dual connectivity or another scenario, a data packet is lost or is repeatedly transmitted because each base station independently configures a mapping relationship between a flow and a DRB. This improves terminal service continuity and improves communication quality.

According to a third aspect, an embodiment of this application provides a data transmission method, including: generating, by a first access network device, a forwarded data packet that includes a flow identifier; and sending, by the first access network device to a second access network device, the forwarded data packet that includes a flow identifier.

In a possible implementation, the method further includes: sending, by the first access network device, a first mapping relationship to the second access network device, where the first mapping relationship is a mapping relationship between a flow and a DRB in the second access network device.

In a possible implementation, the generating, by a first access network device, a forwarded data packet that includes a flow identifier includes:
obtaining, by the first access network device, a cache location of the forwarded data packet, where the cache location is corresponding to the flow identifier of the forwarded data packet; obtaining, by the first access network device, the flow identifier of the forwarded data packet based on the cache location; and adding, by the first access network device, the flow identifier to a header of the forwarded data packet.

In a possible implementation, the method further includes: sending, by the first access network device to the second access network device, a forwarded data packet that includes no flow identifier.

In a possible implementation, the forwarded data packets include at least one type of the following data packets: a PDCP layer data packet that is of the first access network device, to which a sequence number is allocated, and for which no reception acknowledgement is obtained from a terminal; a PDCP layer data packet that is of the first access network device and to which no sequence number is allocated; and an SDAP layer data packet of the first access network device.

In a possible implementation, the forwarded data packet includes an out-of-order data packet received by the first access network device from the terminal.

According to a fourth aspect, an embodiment of this application provides a data transmission method, including: receiving, by a first access network device, a forwarded data packet from a second access network device, where the forwarded data packet includes a flow identifier, and the forwarded data packet includes an out-of-order PDCP layer data packet received by the second access network device from a terminal.

In a possible implementation, the receiving, by a first access network device, a forwarded data packet from a second access network device includes: receiving, by the first access network device, the forwarded data packet from the second access network device via a tunnel established based on a DRB.

In a possible implementation, the method further includes: receiving, by the first access network device, uplink data packets from the terminal, where the uplink data packets include at least one type of the following data packets: a PDCP layer data packet that is unsuccessfully sent by the terminal to the second access network device and to which a sequence number is allocated; a PDCP layer data packet that is of the terminal and to which no sequence number is allocated; and an SDAP layer data packet of the terminal.

In a possible implementation, the receiving, by the first access network device, uplink data packets from the terminal includes: receiving, by the first access network device, the uplink data packets on the first DRB; or receiving, by the first access network device, the uplink data packets on the second DRB.

In a possible implementation, the receiving, by the first access network device, uplink data packets from the terminal includes: receiving, by the first access network device on the first DRB, a PDCP layer data packet that is of the terminal and to which a sequence number is allocated in the uplink data packets; and receiving, by the first access network device on the second DRB, the PDCP layer data packet that is of the terminal and to which no sequence number is allocated in the uplink data packets and/or the Service Data Adaptation Protocol SDAP layer data packet of the terminal in the uplink data packets.

In a possible implementation, the receiving, by the first access network device, uplink data packets from the terminal includes: receiving, by the first access network device, a PDCP layer data packet of the terminal in the uplink data packets on the first DRB; and receiving, by the first access network device, the Service Data Adaptation Protocol SDAP layer data packet of the terminal in the uplink data packets on the second DRB.

According to the data transmission method provided in this embodiment of this application, in an uplink direction, the first access network device receives, from the second access network device, the forwarded data packet that includes a flow identifier. The forwarded data packet includes the out-of-order data packet received by the second access network device from the terminal. After sending of the forwarded data packet is completed, the terminal may send the uplink data packets to a network side in various flexible transmission manners on different DRBs, and a data packet transmission manner can be selected based on an actual network status, to avoid the following problem: In a handover or dual connectivity or another scenario, a data packet is lost or is repeatedly transmitted because each base station independently configures a mapping relationship between a flow and a DRB. This improves terminal service continuity and improves communication quality.

According to a fifth aspect, an embodiment of this application provides a data transmission method, including: sending, by a terminal, uplink data packets to a first access network device, where the uplink data packets include flow identifiers; and/or receiving, by the terminal, downlink data packets from the access network device, where at least one of the downlink data packets includes a flow identifier, and the downlink data packets include a forwarded data packet sent by a second access network device to the first access network device.

In a possible implementation, the sending, by a terminal, uplink data packets to an access network device includes: sending, by the terminal to the first access network device on a first DRB, a PDCP layer data packet that is in the uplink data packets and to which a sequence number is allocated; and sending, by the terminal to the first access network device on a second DRB, a PDCP layer data packet to which no sequence number is allocated in the uplink data packets and/or an SDAP layer data packet in the uplink data packets, where the first DRB meets a mapping relationship between a flow and a DRB in the second access network device, and the second DRB meets a mapping relationship between a flow and a DRB in the first access network device.

In a possible implementation, the sending, by a terminal, uplink data packets to an access network device includes: sending, by the terminal, a PDCP layer data packet in the uplink data packets to the access network device on a first DRB; and sending, by the terminal, an SDAP layer data packet in the uplink data packets to the access network device on a second DRB.

In a possible implementation, the receiving, by the terminal, downlink data packets from the access network device includes: receiving, by the terminal from the first access network device on the first DRB, a data packet in the downlink data packets that includes no flow identifier; and receiving, by the terminal from the first access network device on the second DRB, a data packet in the downlink data packets that includes a flow identifier.

In a possible implementation, the receiving, by the terminal, downlink data packets from the access network device includes: receiving, by the terminal from the first access network device on the first DRB, a PDCP layer data packet that is in the downlink data packets and to which a sequence number is allocated; and receiving, from the first access network device on the second DRB, a PDCP layer data packet that includes a flow identifier and to which no sequence number is allocated in the downlink data packets and/or an SDAP layer data packet in the downlink data packets.

In any one implementation of the fifth aspect, the first DRB meets the mapping relationship between a flow and a DRB in the second access network device, and the second DRB meets the mapping relationship between a flow and a DRB in the first access network device.

According to a sixth aspect, an embodiment of this application provides an access network device. The access network device has a function of implementing the behavior of the first access network device in any one of the foregoing data transmission methods, or has a function of implementing the behavior of the second access network device in any one of the foregoing data transmission methods. The function may be implemented by hardware, or may be implemented by hardware by executing corresponding software. The hardware or the software includes one or more units or means (means) corresponding to the function.

In a possible implementation of the sixth aspect, a structure of the access network device includes a processor and a transceiver. The processor is configured to support the access network device in performing the corresponding function in the foregoing data transmission methods. The transceiver is configured to: support communication between the access network device and a terminal, and send information or instructions in the foregoing data transmission methods to the terminal. The access network device may further include a memory. The memory is configured to be coupled to the processor, and the memory stores necessary program instructions and necessary data of the access network device. The access network device may further include a communications interface. The communications interface is configured to communicate with another network device.

In a possible implementation, the access network device is a base station.

According to a seventh aspect, an embodiment of this application provides a terminal. The terminal has a function of implementing the behavior of the terminal in any one of the foregoing data transmission methods. The function may be implemented by hardware, or may be implemented by hardware by executing corresponding software. The hardware or the software includes one or more units or means (means) corresponding to the function.

In a possible implementation of the seventh aspect, a structure of the terminal includes a processor and a transceiver. The processor is configured to support the terminal in performing the corresponding function in the foregoing data transmission methods. The transceiver is configured to: support communication between an access network device and the terminal, and send information or instructions in the foregoing data transmission methods to the access network device. The terminal may further include a memory. The memory is configured to be coupled to the processor, and the memory stores necessary program instructions and necessary data of the terminal.

According to an eighth aspect, an embodiment of the present invention provides a communications system, including the access network device and the terminal in the foregoing aspects.

According to a ninth aspect, an embodiment of this application provides a computer readable storage medium. The computer readable storage medium stores instructions. When the computer readable storage medium is run on a computer, the computer performs the data transmission method in any one of the foregoing aspects.

According to a tenth aspect, an embodiment of this application provides a computer program product that includes instructions. When the computer program product is run on a computer, the computer performs the data transmission method in any one of the foregoing aspects.

According to the technical solutions provided in the embodiments of this application, various flexible forwarded data packet transmission manners are used to avoid the following problem: In a handover or dual connectivity or another scenario, a data packet is lost or is repeatedly transmitted because each base station independently configures a mapping relationship between a flow and a DRB. This improves terminal service continuity and improves communication quality.

BRIEF DESCRIPTION OF DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

Figure 1:
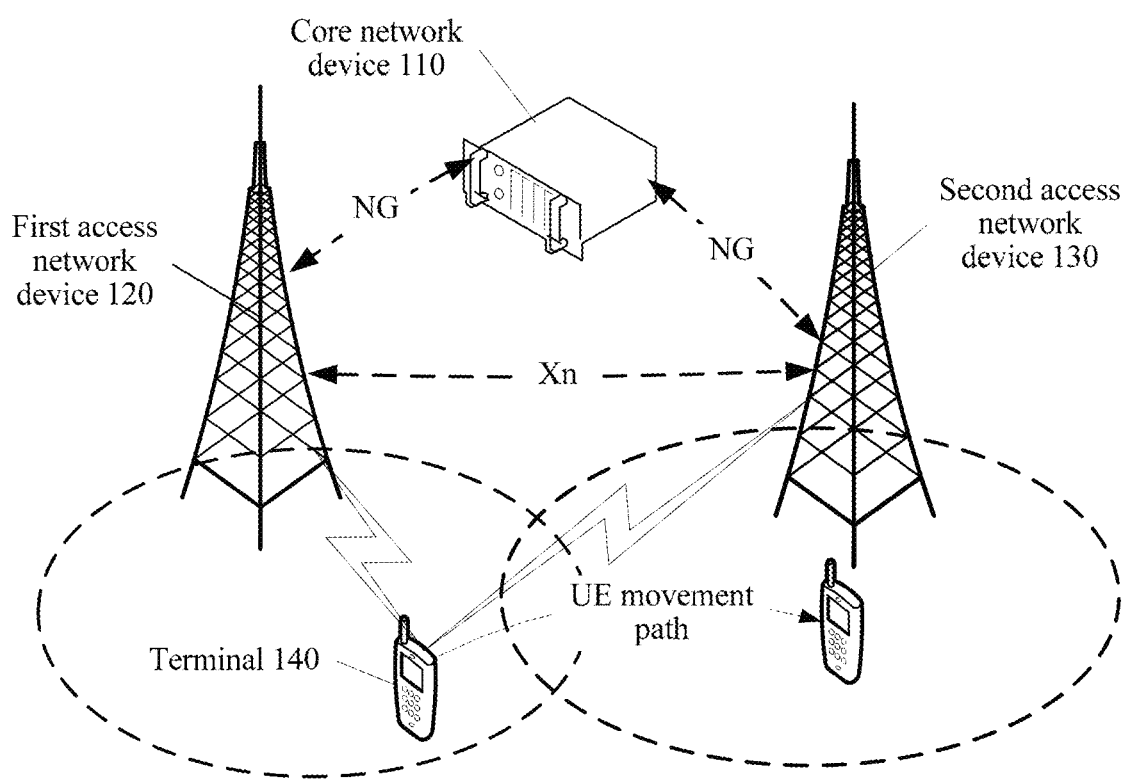
FIG. 1 is a schematic diagram of a communications system according to an embodiment of this application.

Technologies described in embodiments of this application may be used in a 5G (the fifth generation, fifth generation) communications system, or another next-generation communications system, for example, a new radio access network (New RAN, NR).

The access network device described in the embodiments of this application includes a base station device in the NR, for example, a gNB, a transmission point (transmission point, TRP), or a base station device including a central unit (central unit, CU) and a distributed unit (distributed unit, DU). The CU may also be referred to as a control unit (control unit). When a base station device, namely, an evolved NodeB (evolved nodeB, eNB), in a Long Term Evolution (long term evolution, LTE) system can be connected to a 5G core network (5G Core Network, 5G CN), the LTE eNB may also be referred to as an eLTE eNB. Specifically, the eLTE eNB is an LTE base station device evolved from the LTE eNB, and can be directly connected to the 5G CN. The eLTE eNB is also a base station device in the NR. Alternatively, the access network device may be an access point (access point, AP), or another network device capable of communicating with a terminal and a core network. A type of the access network device is not specially limited in the embodiments of this application.

The 5G CN described in the embodiments of this application may also be referred to as a new core (new core) network, a 5G new core network, a next generation core (next generation core, NGC) network, or the like. The 5G CN is disposed independently of an existing core network such as an evolved packet core (evolved packet core, EPC) network.

The terminal in the embodiments of this application may include a handheld device, an in-vehicle device, a wearable device, or a computing device that has a wireless communication function, another processing device connected to a wireless modem, or user equipment (user equipment, UE), a mobile station (mobile station, MS), a terminal device (terminal equipment), or the like that is in various forms.

In the embodiments of this application, a unidirectional communications link from an access network to the terminal is defined as a downlink, data transmitted on the downlink is downlink data, and a transmission direction of the downlink data is referred to as a downlink direction; and a unidirectional communications link from the terminal to the access network is an uplink, data transmitted on the uplink is uplink data, and a transmission direction of the uplink data is referred to as an uplink direction.

A source access network device described in the embodiments of this application is an access network device that the terminal currently accesses or camps on, and the terminal is to be handed over from the access network device to another access network device. Correspondingly, a target access network device described in the embodiments of this application is an access network device to which the terminal is to be handed over.

It should be understood that the term "and/or" in this specification describes only an association relationship between associated objects and indicates that three relationships may exist. For example, A and/or B may indicate the following three cases: Only A exists, both A and B exist, and only B exists. In addition, the character "/" in this specification indicates an "or" relationship between the associated objects.

In the embodiments of this application, "a plurality of" refers to "two or more".

Descriptions such as "first" and "second" in the embodiments of this application are merely used to illustrate and distinguish between described objects, and are not indented to indicate a sequence or indicate a special limitation on a quantity of devices in the embodiments of this application. These descriptions cannot constitute any limitation on the embodiments of this application.

In the embodiments of this application, "connection" means various connection manners such as a direct connection or an indirect connection, for implementing communication between devices. This is not limited in the embodiments of this application.

In the embodiments of this application, "network" and "system" express a same concept, and a communications system is a communications network.

FIG. 1 is a schematic diagram of a communications system according to an embodiment of this application.

As shown in FIG. 1, the communications system includes a core network device 110, a first access network device 120, a second access network device 130, and a terminal 140. The first access network device 120 and the second access network device 130 separately communicate with the core network device 110 via communications interfaces. For example, the communications interface is an NG interface shown in FIG. 1. There may be a communications interface between the first access network device 120 and the second access network device 130, for example, an Xn interface shown in FIG. 1, configured to exchange information between the devices.

It may be understood that the core network device 110 is a core network device in a 5G CN, and includes one or more independently disposed or integrated function entities. For example, the core network device 110 may include a control plane (control plane, CP) network element and a user plane (user plane, UP) network element such as a user plane gateway (user plane gateway, UPGW).

Optionally, the first access network device 120 or the second access network device 130 is a gNB or an eLTE eNB. This is not limited in this embodiment of this application. For example, the first access network device 120 is a gNB and the second access network device 130 is a gNB; or the first access network device 120 is an eLTE eNB and the second access network device 130 is an eLTE eNB; or the first access network device 120 is a gNB and the second access network device 130 is an eLTE eNB; or the first access network device 120 is an eLTE eNB and the second access network device 130 is a gNB.

The core network device 110 separately communicates with the first access network device 120 and/or the second access network device 130 via a protocol data unit (protocol data unit, PDU) session (session). One PDU session may include a plurality of flows. Different flows may have a same QoS requirement or different QoS requirements. The core network device 110 provides a QoS requirement of a flow for the first access network device 120 and/or the second access network device 130, and the first access network device 120 and/or the second access network device 130 complete/completes mapping from the flow to a DRB. Correspondingly, flows included in one DRB have a same or similar QoS requirement. Specifically, the access network device may establish at least one DRB for each session of a terminal that accesses the access network device, including a default DRB (default DRB). The DRB is established between the access network device and the terminal to transmit air-interface data.

In this embodiment of this application, a flow that has a specific QoS requirement may be referred to as a QoS flow, and one QoS flow includes at least one data packet. Each QoS flow is corresponding to one or more service types. The QoS flow is briefly referred to as "flow" in the following embodiments.

In a possible handover (handover) scenario, in a movement process, the terminal 140 accesses an access network device through a handover, to obtain an optimal communications service. For example, when the terminal 140 moves from a signal coverage area of the first access network device 120 currently accessed by the terminal 140 to a signal coverage area of the second access network device 130, the terminal 140 may start a handover procedure to hand over from the first access network device 120 to the second access network device 130. In the handover process, the first access network device 120 may send, to the second access network device 130, a flow that the first access network device 120 is ready to transmit to the terminal 140. The second access network device 130 may map the flow that the first access network device 120 is ready to transmit to the terminal 140 to a DRB that meets a QoS requirement of the flow, and then transmit the flow to the terminal on the DRB.

In a possible dual connectivity (dual-connection, DC) scenario, the terminal 140 accesses both the first access network device 120 and the second access network device 130. When the first access network device 120 determines to offload some services to the second access network device 130, the first access network device 120 may send a flow corresponding to the services to the second access network device 130. The second access network device 130 may map the flow to a DRB that meets a QoS requirement of the flow, and then transmit the flow to the terminal on the DRB. Based on different functions, access network devices connected to the terminal may be classified into a master access network device that has a control plane function and a user plane function that are related to the terminal, and a secondary access network device that can be configured to perform user plane data transmission with the terminal. The master access network device can control a service of the terminal to be migrated between the master access network device and the secondary access network device, and there is no need to distinguish between the master access network device and the secondary access network device when a flow corresponding to the service is forwarded between the access network devices and transmitted over an air interface. Therefore, there is no need to limit the first access network device 120 and the second access network device 130 to master access network devices or secondary access network devices. It may be understood that the terminal may alternatively access one master access network device and a plurality of secondary access network devices. Details are not described.

In the handover process or a dual connectivity process, the first access network device 120 sends data packets related to the terminal 140 to the second access network device 130, and then the second access network device 130 transmits the data packets to the terminal 140. The data packets belong to one or more flows. The data packet transmission process may be referred to as data forwarding (data forwarding), or may be referred to as data backward transmission or data transmission.

Specifically, a tunnel (tunnel) may be established between the first access network device 120 and the second access network device 130 to transmit a data packet that needs data forwarding. The tunnel may be established based on a DRB, or may be established based on an SDAP entity or a session. Alternatively, both types of tunnels may be established. In other words, one tunnel is established based on a DRB, and the other tunnel is established based on an SDAP entity or a session. The tunnel established based on a DRB may be used to transmit a PDCP layer data packet corresponding to the DRB. The tunnel established based on a session or an SDAP entity may be used to transmit a data packet cached at an SDAP layer or transmit a PDCP layer data packet that carries a flow identifier. The SDAP layer is a user plane protocol layer established above a user plane PDCP layer in a protocol stack on an access network side connected to an NGC network. The SDAP layer may be used to map a flow from a non-access stratum (non-access stratum, NAS) to a DRB of an access stratum (access stratum, AS). The SDAP entity is an instance that is established at the SDAP layer to complete a function of the SDAP layer. The SDAP entity is further responsible for adding a flow identifier in an air-interface protocol stack. The flow identifier includes an uplink flow identifier or a downlink flow identifier, used to identify an uplink data flow or a downlink data flow. An access network device may map different flows to a same DRB or different DRBs based on a flow identifier of each flow and a QoS requirement of each DRB, in other words, establish a mapping relationship between a flow and a DRB. For example, if a flow 1 transmitted by the core network to the access network device is a flow corresponding to a machine type communication (machine type communication, MTC) service, and a flow 2 is a flow corresponding to a mobile broadband (mobile broadband, MBB) service, it is considered that the access network device supports different service types, and the flow 1 and the flow 2 may be mapped to a same DRB of the access network device, for example, a default DRB, or may be mapped to two DRBs.

It may be understood that the SDAP entity or the SDAP layer may be referred to as another name, for example, a Packet Data Association Protocol (packets data association protocol, PDAP) entity or layer. Any protocol layer that complies with the foregoing definition and function descriptions of the SDAP layer falls within the protection scope of the SDAP layer described in this embodiment of this application.

Because each access network device independently sets a mapping relationship between a flow and a DRB, after the foregoing data packet that needs data forwarding is sent to the second access network device 130, if the second access network device 130 still transmits the data packet based on a mapping relationship that is between a flow and a DRB and that is configured by the first access network device 120, the data packet may be lost or repeatedly transmitted. This affects terminal service continuity.

Therefore, the embodiments of this application provide a data transmission method, to resolve the following problem about how to forward data and how to transmit, over an air interface, a data packet that needs data forwarding, on a premise that each access network device independently sets a mapping relationship between a flow and a DRB, especially in a handover or dual connectivity scenario.

For ease of description, "first access network device" or "second access network device" has a same meaning in the following embodiments. Details are not described below again. For example, in a handover process, the first access network device in the embodiments of this application may be a target access network device, and the second access network device may be a source access network device. In a dual connectivity scenario, the second access network device in the embodiments of this application may offload (offload) some services to the first access network device, and the first access network device transmits the services to a terminal. For example, when a master cell group bearer (master cell group bearer, MCG bearer) is used, the second access network device is a master base station and the first access network device is a secondary base station; or when a secondary cell group bearer (secondary cell group bearer, SCG bearer) is used, the second access network device is a secondary base station and the first access network device is a master base station.

Figure 2:
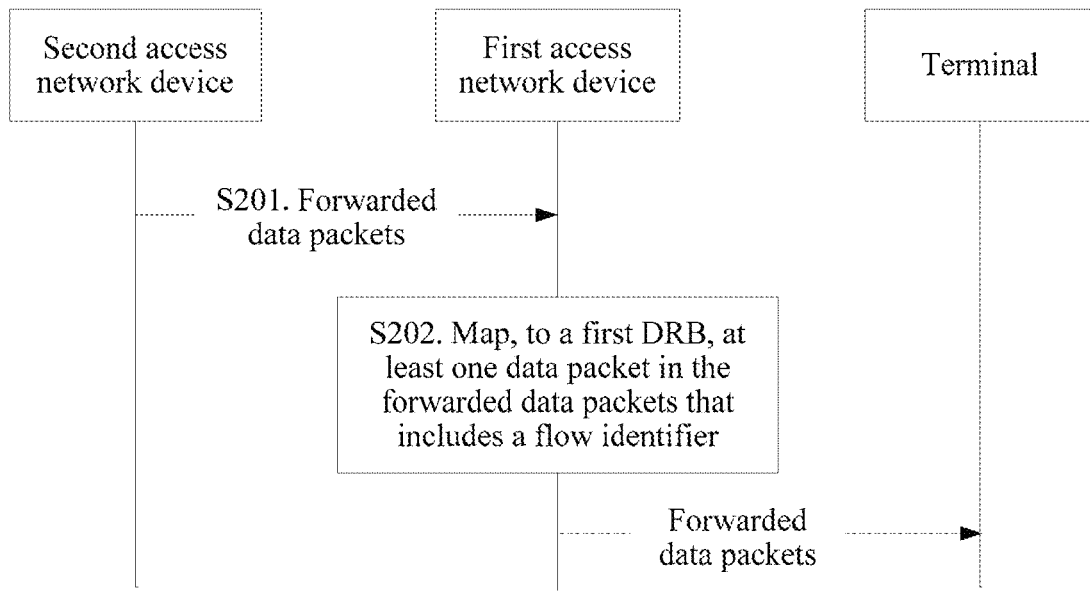
FIG. 2 is a schematic flowchart of a data transmission method according to an embodiment of this application.

FIG. 2 is a schematic flowchart of a data transmission method according to an embodiment of this application.

The data transmission method provided in this application is applicable to various communication scenarios that have a process of forwarding data between base stations, such as a handover process or a dual connectivity process of a terminal. This is not limited in this embodiment of this application.

The method includes the following steps.

S201. A first access network device receives forwarded data packets (or a forwarded data packet) from a second access network device.

The forwarded data packets are data packets that need data forwarding and that are sent by the second access network device to the first access network device, namely, data packets sent by the second access network device to the first access network device in a data forwarding process.

Specifically, in a downlink direction, the forwarded data packets include at least one type of the following data packets: a PDCP layer data packet of the second access network device, to which a sequence number (sequence number, SN) is allocated, and for which no reception acknowledgement is obtained from a terminal; a PDCP layer data packet of the second access network device to which no sequence number is allocated; and an SDAP layer data packet of the second access network device.

PDCP layer data packets include a PDCP PDU and a PDCP SDU. When the second access network device forwards the PDCP PDU to the first access network device, the second access network device may perform processing such as decryption or protocol header removal on the PDCP PDU, to obtain a PDCP SDU whose sequence number is retained. Therefore, all PDCP layer data packets are forwarded between base stations in a form of PDCP SDUs, including a PDCP SDU to which a sequence number is allocated and a PDCP SDU to which no sequence number is allocated. In this embodiment of this application, the sequence number of the PDCP SDU is a PDCP layer sequence number that may be denoted as a PDCP SN.

S202. The first access network device maps, to a first DRB, at least one data packet in the forwarded data packets that includes a flow identifier, where the first DRB is corresponding to a DRB of the second access network device.

The first access network device may map, to the first DRB, all data packets including flow identifiers in the forwarded data packets or some data packets including flow identifiers in the forwarded data packets.

The first DRB and the DRB of the second access network device each meet a first mapping relationship, and the first mapping relationship is a mapping relationship between a flow and a DRB in the second access network device. Specifically, the first DRB is established by the first access network device and is used to transmit data between the first access network device and the terminal. When the first access network device receives information about one or more flows of the DRB of the second access network device, the first access network device may establish a reflect DRB (reflect DRB). The reflect DRB can maintain a transmission status of a specific DRB of the second access network device, to continue to transmit a data packet on the DRB of the second access network device. For ease of description, a DRB of the second access network device corresponding to the reflect DRB may be referred to as "third DRB". Specifically, the reflect DRB has a same PDCP SN status and hyper frame number (hyper frame number, HFN) status as the third DRB. The PDCP SN status and the HFN status may indicate a sending status and a receiving status of a PDCP data packet on the DRB. The reflect DRB is the foregoing "first DRB".

Optionally, the first access network device receives the first mapping relationship from the second access network device.

Optionally, the first access network device maps, to the first DRB, a data packet in the forwarded data packets that includes no flow identifier.

After the first access network device maps some or all of the forwarded data packets to the first DRB, the first access network device sends the corresponding data packets to the terminal on the first DRB, for example, sends, on the first DRB, some or all data packets including flow identifiers in the forwarded data packets and all data packets including no flow identifier in the forwarded data packets.

Optionally, in an implementation of this application, the method further includes: mapping, by the first access network device, to a second DRB based on a second mapping relationship, at least one data packet in the forwarded data packets including a flow identifier other than the data packet mapped to the first DRB, where the second mapping relationship is a mapping relationship between a flow and a DRB in the first access network device.

The second mapping relationship may include a correspondence between a flow identifier of each flow and a DRB in the first access network device. The first access network device may configure the mapping relationship between a flow and a DRB based on a QoS requirement, and establish the second DRB based on the mapping relationship. Such a DRB established by an access network device based on a mapping relationship that is configured by the access network device between a flow and a DRB may also be referred to as a new DRB (new DRB). The QoS requirement includes a QoS parameter. When a handover between access network devices is performed via a direct interface, the QoS parameter may be configured by a source access network device and sent by the source access network device to a target access network device. When a handover between access network devices is performed via a core network, the QoS parameter may be sent from a source base station to a core network device, and then sent by the core network device to a target access network device. The core network device may modify the QoS parameter.

The first access network device may separately send, on the first DRB and the second DRB, the data packets including flow identifiers in the forwarded data packets, for example, send, to the terminal on the first DRB, some data packets that include flow identifiers, and send, to the terminal on the second DRB, the other data packets that include flow identifiers. Specifically, the first access network device may send, to the terminal on the first DRB, a PDCP layer data packet including a flow identifier and to which a sequence number is allocated in the forwarded data packets, and send, to the terminal on the second DRB, a PDCP layer data packet including a flow identifier and to which no sequence number is allocated in the forwarded data packets.

Specifically, an SDAP entity of the first access network device may separately route (route), to different DRBs, the data packets that include flow identifiers.

It may be understood that the second DRB may be the same as or different from the first DRB. If the first mapping relationship is the same as the second mapping relationship, the first DRB is the same as the second DRB. Specifically, a DRB of the first access network device may be first used as a reflect DRB to send a received forwarded data packet, and then used as a new DRB to send a data packet received from a core network. The same DRB is divided into the reflect DRB and the new DRB in a time dimension. In other words, different mapping relationships between a flow and a DRB may be used for different data packets received at different times. If the first mapping relationship is different from the second mapping relationship, the first DRB and the second DRB may be two independently established DRBs.

Optionally, in an implementation of this application, if a quantity of second DRBs is less than a quantity of first DRBs, and the first DRB is different from the second DRB, after data packet sending on the first DRB is completed, the first access network device and the terminal may release the first DRB, so that overheads of the terminal and the first access network device can be reduced. Specifically, the first access network device may notify the terminal to release the first DRB. The terminal receives, from the first access network device, a notification message for instructing the terminal to release the first DRB, and releases a configuration of the first DRB. After receiving the notification message, the terminal can acknowledge that downlink data packet sending on the first DRB is completed. The notification message may be considered as an end marker (end marker), used to indicate that downlink data packet transmission on the first DRB ends.

Optionally, the first access network device may send the second mapping relationship to the second access network device, and the second access network device sends the second mapping relationship to the terminal.

Optionally, in an implementation of this application, the first access network device receives the forwarded data packets via a tunnel between the first access network device and the second access network device. In a downlink direction, the tunnel between the first access network device and the second access network device may be established in different manners. A tunnel establishment manner is not specially limited in this embodiment of this application.

For example, the tunnel is a tunnel established based on a DRB. The tunnel established based on a DRB may be established between the third DRB of the second access device and the reflect DRB of the first access device, or may be established between the third DRB and the new DRB of the first access device. One or more DRB-based tunnels may be established between the first access network device and the second access network device. The tunnel established based on a DRB may be used to transmit the PDCP layer data packet.

Optionally, the first access network device may map, to the first DRB, a data packet including no flow identifier that is received via the tunnel established based on a DRB, and map, to the second DRB, a data packet including a flow identifier that is received via the tunnel established based on a DRB.

For another example, the tunnel is a tunnel established based on a session. The tunnel established based on a session may also be referred to as a tunnel established based on an SDAP entity, and the tunnel is established between the SDAP entity of the first access device and an SDAP entity of the second access network device that are corresponding to a same session.

The tunnel established based on a session may be used to transmit a data packet carrying a flow identifier to which no sequence number is allocated in the forwarded data packets on all DRBs in the session.

Optionally, the first access network device routes, to the first DRB via the SDAP entity, a PDCP layer data packet that is received from the tunnel established based on a session and to which a sequence number is allocated, and routes, to the second DRB, a PDCP layer data packet to which no sequence number is allocated or the SDAP layer data packet.

For another example, the tunnel includes a tunnel established based on a DRB and a tunnel established based on a session.

Optionally, the tunnel established based on a DRB is used to transmit the PDCP layer data packet, and the tunnel established based on a session is used to transmit the SDAP layer data packet.

Optionally, the tunnel established based on a DRB is used to transmit a data packet that is cached at a PDCP layer of the second access network device, and to which a sequence number is allocated. The tunnel established based on a session is used to transmit the data packet in the forwarded data packets that carries a flow identifier, including the SDAP layer data packet of the second access network device, and/or a data packet carrying a flow identifier to which no sequence number is allocated that is cached at the PDCP layer of the second access network device.

Optionally, the first access network device may map, to the first DRB, a data packet received via the tunnel established based on a DRB, and map, to the second DRB, a data packet received via the tunnel established based on a session.

In this embodiment of this application, the SDAP layer data packet includes a data packet cached at the SDAP layer, and the PDCP layer data packet includes a data packet cached at the PDCP layer.

It may be understood that the first access network device may simultaneously establish a tunnel and a DRB. For example, in a handover scenario, if a handover request message sent by the second access network device to the first access network device includes information required for establishing a tunnel and information required for establishing a DRB, the first access network device can perform a corresponding operation after receiving the related information.

According to the data transmission method provided in this embodiment of this application, the first access network device receives the forwarded data packets from the second access network device, and the first access network device may map, to the first DRB established by the first access network device, the at least one data packet in the forwarded data packets that includes a flow identifier. The first DRB is corresponding to the DRB of the second access network device. Further, to obtain better network performance, the first access network device establishes the second DRB. The second DRB is used to transmit the data packet having a flow identifier in the forwarded data packets other than the data packet mapped to the first DRB, and the second DRB meets the mapping relationship that is between a flow and a DRB and that is configured by the first access network device. Therefore, the forwarded data packets can be transmitted in various flexible transmission manners on different DRBs, and a data packet transmission manner can be selected based on an actual network status, to avoid the following problem: In a handover or dual connectivity or another scenario, a data packet is lost or is repeatedly transmitted because each base station independently configures a mapping relationship between a flow and a DRB. This improves terminal service continuity and improves communication quality.

Figure 3:
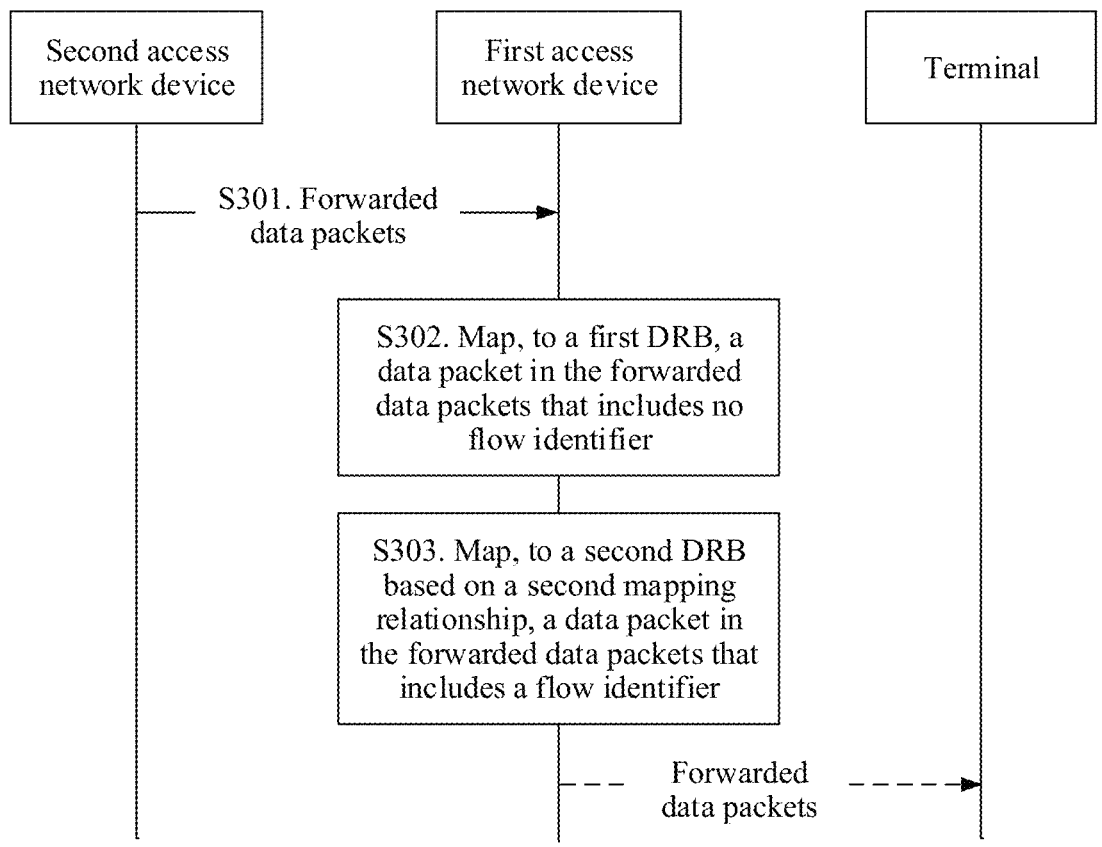
FIG. 3 is a schematic flowchart of a data transmission method according to an embodiment of this application.

FIG. 3 is a schematic flowchart of a data transmission method according to an embodiment of this application.

Similar to the data transmission method provided in the embodiment shown in FIG. 2, the data transmission method provided in this embodiment is applicable to various scenarios that have a process of forwarding data between base stations, such as a handover process or a dual connectivity process of a terminal. Details are not described.

The method includes the following steps.

S301. A first access network device receives forwarded data packets (or a forwarded data packet) from a second access network device.

For detailed descriptions of the forwarded data packets, refer to the related content in the embodiment shown in FIG. 2. Details are not described herein again.

S302. The first access network device maps, to a first DRB, a data packet in the forwarded data packets that includes no flow identifier, where the first DRB is corresponding to a DRB of the second access network device (briefly referred to as "third DRB").

Specifically, the first DRB and the third DRB each meet a first mapping relationship, and the first mapping relationship is a mapping relationship between a flow and a DRB in the second access network device.

Optionally, the first access network device receives the first mapping relationship from the second access network device.

S303. The first access network device maps, to a second DRB based on a second mapping relationship, a data packet in the forwarded data packets that includes a flow identifier, where the second mapping relationship is a mapping relationship between a flow and a DRB in the first access network device.

The first DRB is a reflect DRB, and the second DRB is a new DRB. For related detailed descriptions, refer to the related content in the embodiment shown in FIG. 2. Details are not described herein again. It may be understood that the first DRB and the second DRB are separately established by the first access network device, and there is no execution sequence of steps of establishing the first DRB and establishing the second DRB by the first access network device.

For detailed descriptions of the first mapping relationship and the second mapping relationship, refer to the related content in the embodiment shown in FIG. 2. Details are not described herein again.

Optionally, the first access network device routes, via an SDAP entity to the second DRB, the data packet in the forwarded data packets that includes a flow identifier.

It may be understood that there is no execution sequence of step S302 and step S303. For example, S302 may be performed before S303, or S303 may be performed before S302, or the two steps S302 and S303 may be simultaneously performed. This is not specially limited in this embodiment of this application.

Optionally, in an implementation of this application, the method further includes: sending, by the first access network device to a terminal on the first DRB, a data packet in the forwarded data packets that includes no flow identifier and to which a sequence number is allocated; and sending, by the first access network device to the terminal on the second DRB, a data packet in the forwarded data packets that includes a flow identifier and to which no sequence number is allocated. The data packet may be a PDCP layer data packet, and the sequence number is a PDCP SN.

Optionally, in an implementation of this application, the method further includes: sending, by the first access network device to a terminal on the first DRB, a data packet in the forwarded data packets that includes no flow identifier; and sending, by the first access network device to the terminal on the second DRB, a data packet in the forwarded data packets that includes a flow identifier.

Optionally, in an implementation of this application, if a quantity of second DRBs is less than a quantity of first DRBs, and the first DRB is different from the second DRB, after data packet sending on the first DRB is completed, the first access network device and the terminal may separately release the first DRB, so that overheads of the terminal and the first access network device can be reduced. For related detailed descriptions, refer to the related content in the embodiment shown in FIG. 2. Details are not described herein again.

Optionally, the first access network device may send the second mapping relationship to the second access network device, and the second access network device sends the second mapping relationship to the terminal.

Optionally, in an implementation of this application, the first access network device receives the forwarded data packets via a tunnel between the first access network device and the second access network device. In a downlink direction, the tunnel between the first access network device and the second access network device may be established in different manners.

For example, the first access network device receives the forwarded data packets from the second access network device via a tunnel established based on a DRB and a tunnel established based on a session.

Optionally, the tunnel established based on a DRB is used to transmit a data packet that is cached at a PDCP layer of the second access network device, and to which a sequence number is allocated. The tunnel established based on a session is used to transmit the data packet in the forwarded data packets that carries a flow identifier, including an SDAP layer data packet of the second access network device, and/or a data packet that is cached at the PDCP layer of the second access network device, that carries a flow identifier, and to which no sequence number is allocated.

For another example, the first access network device receives the forwarded data packets from the second access network device via a tunnel established based on a DRB.

For another example, the first access network device receives, from the second access network device via a tunnel established based on a session, the data packet in the forwarded data packets that includes a flow identifier.

Optionally, the first access network device routes, to the first DRB via the SDAP entity, a PDCP layer data packet that is received from the tunnel established based on a session and to which a sequence number is allocated, and routes, to the second DRB, a PDCP layer data packet to which no sequence number is allocated or an SDAP layer data packet.

For detailed descriptions of the foregoing various tunnels, refer to the related content in the embodiment shown in FIG. 2. Details are not described herein again.

Optionally, after sending of the forwarded data packet mapped to the first DRB is completed, the first access network device may release the first DRB, to save a resource. For detailed descriptions of releasing the first DRB, refer to the related content in the embodiment shown in FIG. 2. Details are not described herein again.

According to the data transmission method provided in this embodiment of this application, on a premise that each access network device can independently set a mapping relationship between a flow and a DRB, the data packet that has a flow identifier is mapped to the second DRB for transmission, and the data packet that has no flow identifier is mapped to the first DRB for transmission. Therefore, a data packet transmission manner can be selected based on an actual network status, to avoid the following problem: In a handover or dual connectivity or another scenario, a data packet is lost or is repeatedly transmitted because each access network device independently configures a mapping relationship between a flow and a DRB. This improves terminal service continuity and improves communication quality.

Figure 4:
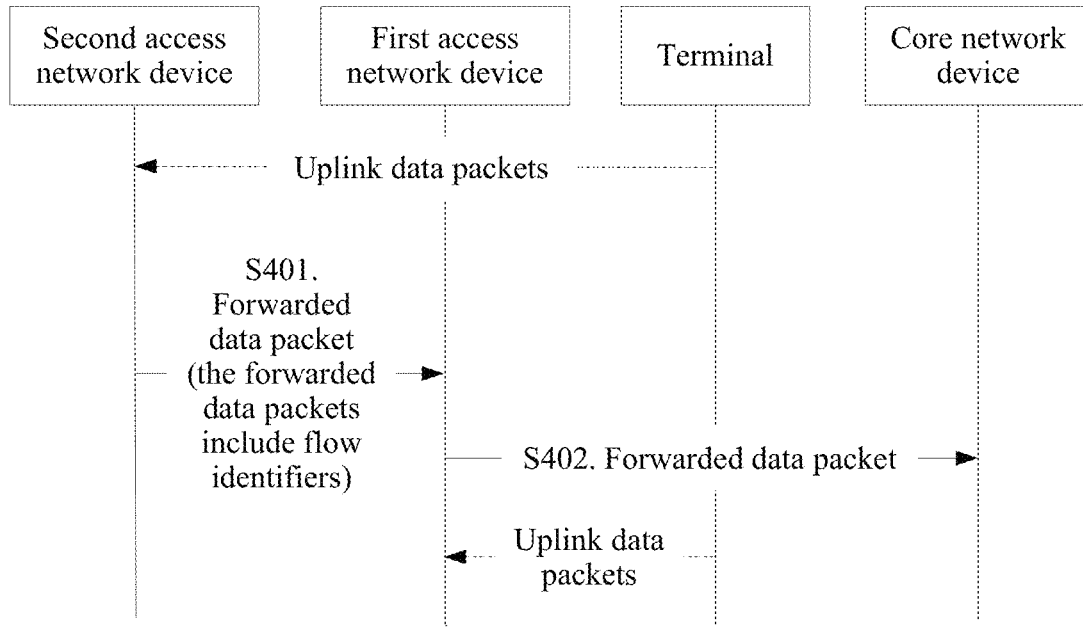
FIG. 4 is a schematic flowchart of a data transmission method according to an embodiment of this application.

FIG. 4 is a schematic flowchart of a data transmission method according to an embodiment of this application.

The data transmission method provided in this embodiment is applicable to various scenarios that have a process of forwarding data between base stations, such as a handover process or a dual connectivity process of a terminal. Details are not described.

The method includes the following steps.

S401. A first access network device receives a forwarded data packet (or forwarded data packets) from a second access network device, where the forwarded data packet includes a flow identifier, and the forwarded data packet includes an out-of-order data packet received by the second access network device from a terminal.

Specifically, in an uplink direction, the forwarded data packet is an out-of-order PDCP layer data packet received by the second access network device from the terminal. For example, if a sequence number of a last PDCP SDU sequentially received by the second access network device is an SN, in other words, PDCP SDUs whose sequence numbers (..., SN−1, SN) are less than the SN have been sequentially received, an out-of-order PDCP SDU that is received by the second access network device and whose sequence number is greater than the SN is a data packet that needs data forwarding. For example, data forwarding is required for PDCP SDUs whose sequence numbers are SN+3, SN+4, and SN+6 and that are received by the second access network device after receiving the PDCP SDU with the sequence number being the SN.

S402. The first access network device sends the received forwarded data packet (or forwarded data packets) to a core network device.

Optionally, the first access network device receives the forwarded data packet via a tunnel between the first access network device and the second access network device. The tunnel may be a tunnel that is established between the first access network device and the second access network device based on a DRB. For the tunnel, refer to the related descriptions of the tunnel established based on a DRB in another embodiment of this application. Details are not described again.

Optionally, in an implementation of this application, the method further includes: receiving, by the first access network device, uplink data packets from the terminal, where the uplink data packets include at least one type of the following data packets: a PDCP layer data packet that is unsuccessfully sent by the terminal to the second access network device and to which a sequence number is allocated; a PDCP layer data packet of the terminal, to which no sequence number is allocated; and an SDAP layer data packet of the terminal.

Optionally, after the terminal completes uplink data packet sending on a first DRB, the terminal may request the first access network device to release the first DRB. The first access network device may consider that a request sent by the terminal to release the first DRB is an end marker, and the request is used to indicate that uplink data packet transmission on the first DRB ends.

After accessing the first access network device, the terminal may send the uplink data packets to the first access network device in different sending manners.

Optionally, the first access network device receives the uplink data packets on the first DRB.

Optionally, the first access network device receives the uplink data packets on a second DRB.

Optionally, the first access network device receives, on the first DRB, a PDCP layer data packet of the terminal, to which a sequence number is allocated in the uplink data packets; and the first access network device receives, on a second DRB, the PDCP layer data packet of the terminal, to which no sequence number is allocated in the uplink data packets and/or the SDAP layer data packet of the terminal in the uplink data packets.

Optionally, the first access network device receives a PDCP layer data packet of the terminal in the uplink data packets on the first DRB; and the first access network device receives the SDAP layer data packet of the terminal in the uplink data packets on a second DRB.

The first DRB is a reflect DRB, and the second DRB is a new DRB. For related detailed descriptions, refer to the related content in another embodiment of this application. Details are not described herein again.

According to the data transmission method provided in this embodiment of this application, in the uplink direction, the first access network device receives, from the second access network device, the forwarded data packet that includes a flow identifier. The forwarded data packet includes the out-of-order data packet received by the second access network device from the terminal. After sending of the forwarded data packet is completed, the terminal may send the uplink data packets to a network side in various flexible transmission manners on different DRBs, and a data packet transmission manner can be selected based on an actual network status, to avoid the following problem: In a handover or dual connectivity or another scenario, a data packet is lost or is repeatedly transmitted because each base station independently configures a mapping relationship between a flow and a DRB. This improves terminal service continuity and improves communication quality.

Figure 5:
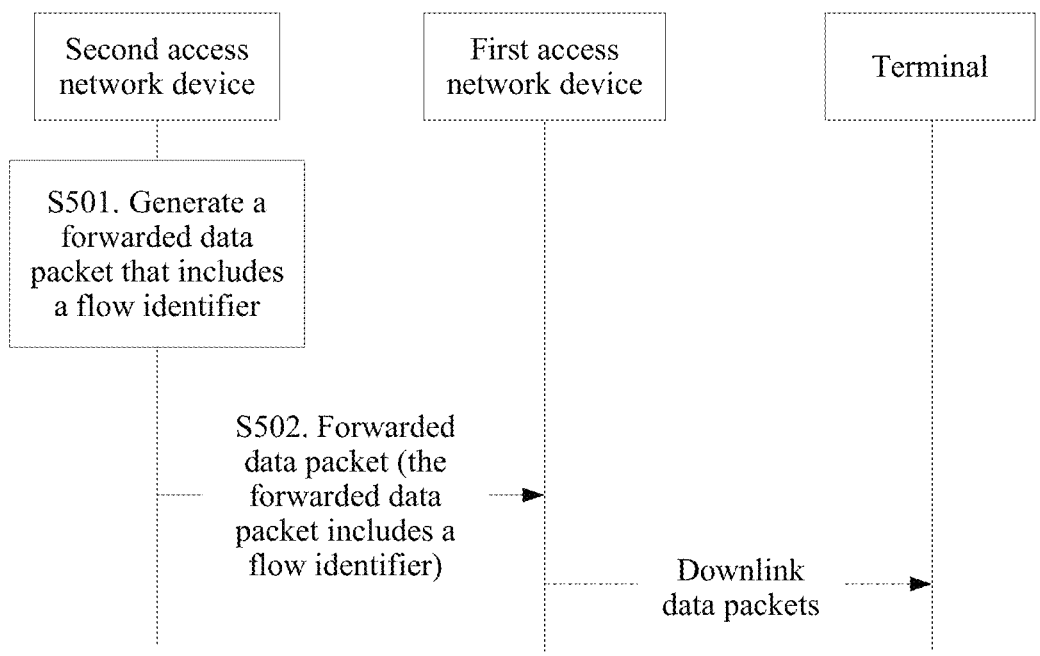
FIG. 5 is a schematic flowchart of a data transmission method according to an embodiment of this application.

FIG. 5 is a schematic flowchart of a data transmission method according to an embodiment of this application.

Similar to the data transmission method provided in the embodiment shown in FIG. 2, the data transmission method provided in this embodiment is applicable to various scenarios that have a process of forwarding data between base stations, such as a handover process or a dual connectivity process of a terminal. Details are not described.

The method includes the following steps.

S501. A second access network device generates a data packet for forwarding that includes a flow identifier (or data packets for forwarding that include flow identifiers).

S502. The second access network device sends, to a first access network device, the data packet for forwarding that includes a flow identifier (or data packets for forwarding that include flow identifiers).

Optionally, in a downlink direction, the data packet for forwarding includes at least one type of the following data packets: a PDCP layer data packet of the second access network device, to which a sequence number is allocated, and for which no reception acknowledgement is obtained from a terminal; a PDCP layer data packet of the second access network device to which no sequence number is allocated; and a Service Data Adaptation Protocol SDAP layer data packet of the second access network device.

Optionally, in the downlink direction, the second access network device further sends, to the first access network device, a data packet for forwarding that includes no flow identifier (or data packets for forwarding include no flow identifier).

Optionally, in the downlink direction, the second access network device may send the data packets for forwarding to the first access network device via different types of tunnels. For detailed descriptions of various tunnels and transmission of the data packets for forwarding in the various tunnels, refer to the related content in another embodiment of this application. Details are not described herein again.

It may be understood that in the downlink direction, the first access network device may send, to the terminal, downlink data packets that include the forwarded data packet. Specifically, after the second access network device sends the data packet for forwarding to the first access network device, the first access network device may map the forwarded data packet to a corresponding DRB based on a factor such as content (for example, whether the forwarded data packet has a flow identifier, or whether a sequence number is allocated to the forwarded data packet) of the forwarded data packet or a type of a tunnel that carries the forwarded data packet, to transmit the forwarded data packet. For detailed descriptions of mapping the forwarded data packet to the corresponding DRB by the first access network device, refer to the related content in another embodiment of this application. Details are not described herein again. Then, the first access network device sends, to the terminal, another downlink data packet obtained from a core network.

Optionally, in an implementation of this application, in the downlink direction, a PDCP entity of the second access network device obtains the flow identifier, so that the second access network device may add the flow identifier to the data packet for forwarding, and generate the data packet for forwarding that includes the flow identifier, and then the first access network device parses the forwarded data packet to obtain the flow identifier.

Optionally, the second access network device obtains the flow identifier of the data packet based on a correspondence between a service access point (service access point, SAP) and the flow identifier. Specifically, the second access network device establishes one or more SAPs between an SDAP entity and a PDCP entity, and the PDCP entity separately caches a PDCP PDU or a PDCP SDU based on an SAP and a flow identifier. Each SAP is corresponding to one flow. When forwarding data, the second access network device may send the PDCP PDU or the PDCP SDU to the SDAP entity based on the SAP, and then the SDAP entity may obtain the flow identifier of the PDCP layer data packet based on a correspondence between the SAP and a flow. Alternatively, the PDCP entity may obtain the flow identifier based on SAP information. The forwarded data packet includes a PDCP PDU and a PDCP SDU, and a PDCP SDU that carries a sequence number is generated after processing such as protocol header removal or decryption is performed on the PDCP PDU.

Optionally, the second access network device obtains the flow identifier of the data packet based on a cache location of the data packet. Specifically, an SDAP entity of the second access network device sends the flow identifier of the data packet to a PDCP entity, and the PDCP entity establishes a correspondence between the flow identifier and the cache location of the data packet. For example, the PDCP entity may cache the received PDCP SDU based on the flow identifier. Then, the second access network device obtains the cache location of the forwarded data packet. The cache location of the forwarded data packet is corresponding to the flow identifier of the forwarded data packet. The second access network device obtains the flow identifier of the data packet based on the cache location of the data packet. Optionally, an SDAP layer of the second access network device further includes indication information, and the indication information is used to indicate whether a PDCP layer adds a flow identifier to a PDCP PDU and sends, over an air interface, the PDCP PDU that includes the flow identifier. For example, if the indication information indicates that no flow identifier is added, the PDCP PDU is generated by removing data of the flow identifier from an SDAP header. Because the PDCP PDU includes no flow identifier, data overheads are reduced.

Optionally, in a handover preparation process, an SDAP entity of the second access network device may add a flow identifier to a received data packet, and indicate that the flow identifier is used only for a handover process. Therefore, the first access network device may restore the flow identifier based on the received forwarded data packet.

Optionally, in a handover preparation process, an SDAP entity of the second access network device may add a flow identifier to a received data packet. For example, when the second access network device freezes a transmission status, the SDAP entity starts to add flow identifiers to all data packets to be sent to a PDCP layer, and the transmission status freezing means that the second access network device no longer sends data to the terminal. Therefore, the first access network device may restore the flow identifier based on the received forwarded data packet.

Optionally, the second access network device determines the flow identifier based on a sequence number included in the forwarded data packet. Specifically, an SDAP entity of the second access network device caches the data packet, configures an SDAP sequence number for the cached data packet, and sends, to a PDCP entity, the data packet for which the SDAP sequence number is configured. If the PDCP entity successfully sends, to the first access network device, a data packet that includes a PDCP SN, the PDCP entity sends an indication to an SDAP layer. After receiving the indication, the SDAP layer deletes a data packet corresponding to the data packet that includes the PDCP SN. A data packet cached at the SDAP layer has a flow identifier, a data packet sent by the SDAP entity to the PDCP entity includes an SDAP sequence number, and the SDAP sequence number is corresponding to the flow identifier. Therefore, the SDAP entity of the second access network device obtains the flow identifier of the data packet through matching based on the SDAP sequence number of the data packet received from the PDCP layer.

Optionally, in an uplink direction, the forwarded data packet includes an out-of-order data packet received by the second access network device from the terminal. All forwarded data packets in the uplink direction include flow identifiers. The second access network device may send the forwarded data packet in the uplink direction to the first access network device via a tunnel established based on a DRB. Details are not described.

It may be understood that in the uplink direction, after the second access network device sends the forwarded data packet to the first access network device, the first access network device may send the forwarded data packet to the core network. After accessing the first access network device, the terminal may send uplink data packets to the first access network device on different DRBs. For detailed descriptions of sending, by the terminal, the uplink data packets to the first access network device, refer to the related content in another embodiment of this application. Details are not described herein again.

Figure 6:
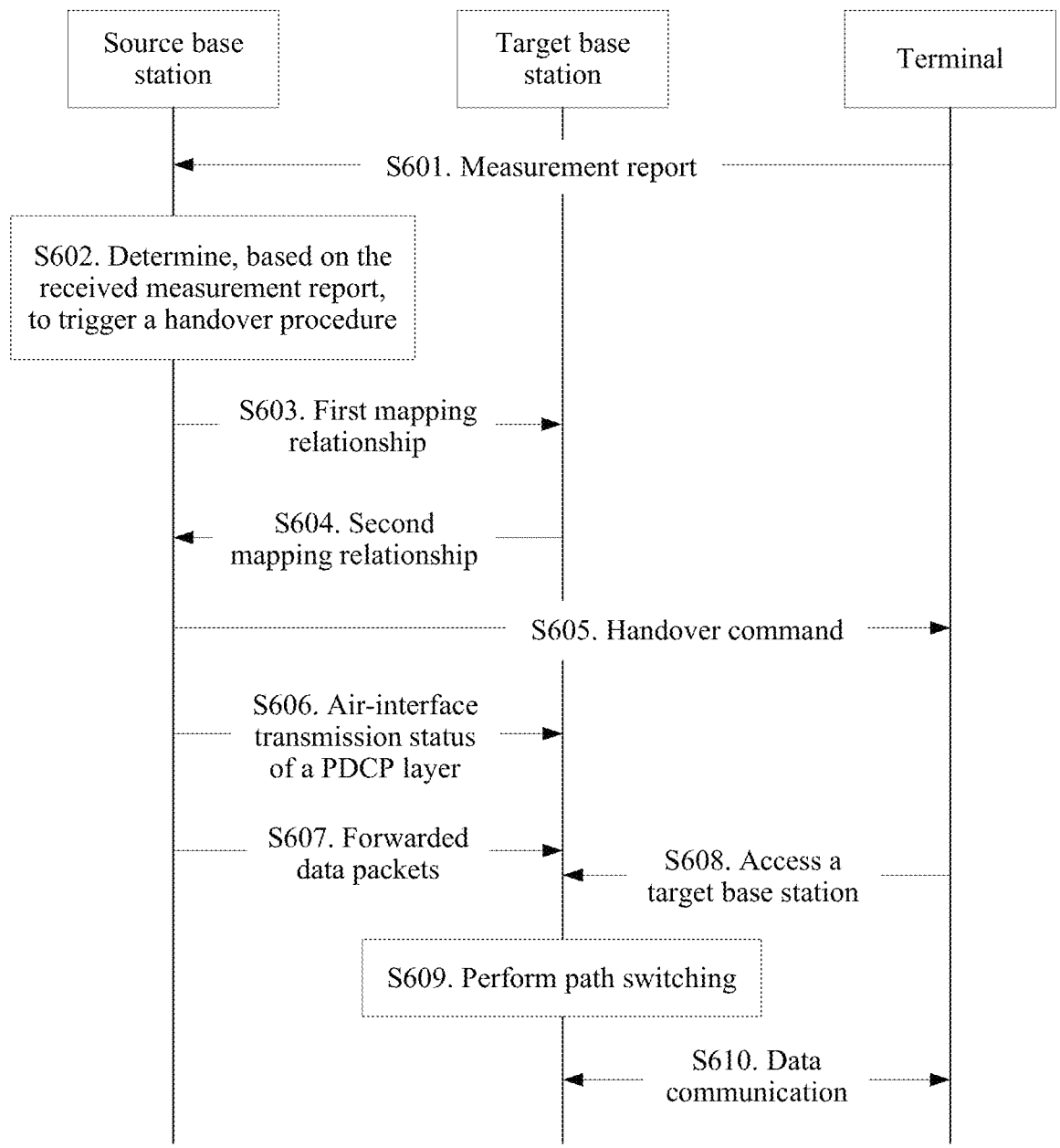
FIG. 6 is a schematic signaling flowchart of a data transmission method according to an embodiment of this application.

FIG. 6 is a schematic signaling flowchart of a data transmission method according to an embodiment of this application.

In the embodiment shown in FIG. 6, an example in which a terminal is handed over from a source base station to a target base station is used to describe the data transmission method provided in this embodiment of this application. It may be understood that the embodiment shown in FIG. 6 is a further explanation and description of the embodiments shown in FIG. 2 to FIG. 5. The source base station is an example of the second access network device in the embodiments shown in FIG. 2 to FIG. 5. The target base station is an example of the first access network device in the embodiments shown in FIG. 2 to FIG. 5. Mutual reference may be made between the embodiments provided in this application.

The method includes the following steps.

S601. A terminal sends a measurement report to a source base station.

S602. The source base station determines, based on the received measurement report, to trigger a handover procedure.

S603. The source base station sends a first mapping relationship to a target base station.

The first mapping relationship is a mapping relationship that is between a flow and a DRB and that is configured by the source base station. For detailed descriptions of the first mapping relationship, refer to the related content of another embodiment of this application. Details are not described herein again.

Optionally, the first mapping relationship is included in signaling or a message that is sent by the source base station to the target base station in a handover process, for example, a handover request message. This is not limited in this embodiment of this application.

Optionally, after the target base station receives the handover request message sent by the source base station, the target base station may establish a DRB between the target base station and the terminal, including a reflect DRB (namely, the first DRB in the embodiment shown in FIG. 2 or FIG. 3) for maintaining a transmission status of a DRB of the source base station. In addition to the reflect DRB, the target base station may further establish a new bearer (namely, the second DRB in the embodiment shown in FIG. 2 or FIG. 3) based on a mapping relationship that is between a flow and a DRB and that is configured by the target base station. For detailed descriptions of the reflect DRB and the new DRB, refer to the related content in another embodiment of this application. Details are not described herein again.

S604. The target base station sends a second mapping relationship to the source base station.

The second mapping relationship may be included in signaling or a message that is sent by the target base station to the source base station in the handover process, for example, a handover request response message. This is not limited in this embodiment of this application.

The second mapping relationship is a mapping relationship that is between a flow and a DRB and that is configured by the target base station. For detailed descriptions of the second mapping relationship, refer to the related content of another embodiment of this application. Details are not described herein.

S605. The source base station sends a handover command to the terminal.

The handover command may include the second mapping relationship, so that the terminal may obtain the second mapping relationship.

The second mapping relationship may be the same as or different from the first mapping relationship. Specifically, because each access network device independently configures a mapping relationship between a DRB and a flow based on a QoS requirement of the flow, the mapping relationship that is between a DRB and a flow and that is configured by the target base station may be the same as or different from the mapping relationship that is between a DRB and a flow and that is configured by the source base station.

Optionally, the response message and the handover command further include a third mapping relationship, and the third mapping relationship is a correspondence between the reflect DRB configured by the target base station and the DRB configured by the target base station.

S606. The source base station sends an air-interface transmission status of a PDCP layer to the target base station.

The air-interface transmission status of the PDCP layer means a sending status and a receiving status of a PDCP layer data packet on the DRB of the source base station. A transmission status of an uplink data packet includes a sequence number of a first lost PDCP SDU, and a receiving status of a PDCP SDU between the first lost PDCP SDU and a last received PDCP SDU. The receiving status specifically means whether a data packet is received. A transmission status of a downlink data packet includes a sequence number of a next PDCP SDU to which the target base station needs to allocate a sequence number, and the sequence number includes a PDCP SN and an HFN.

S607. The source base station sends data packets for forwarding (or a data packet for forwarding) to the target base station.

The data packets for forwarding include a data packet for forwarding in an uplink direction, and/or a data packet for forwarding in a downlink direction. For detailed descriptions of the forwarded data packets, refer to the related content in the embodiments shown in FIG. 2 to FIG. 4. Details are not described herein again.

Specifically, the source base station may send the data packets for forwarding to the target base station via a tunnel between the source base station and the target base station. For various tunnels and specific tunnel establishment manners, refer to the related content in the embodiments shown in FIG. 2 to FIG. 5. Details are not described herein again.

In this embodiment, a PDCP entity of the source base station obtains a flow identifier of the data packet, so that the source base station may add the flow identifier to the data packet for forwarding, and then the target base station may map the forwarded data packet to a corresponding DRB based on the flow identifier. For detailed descriptions of generating, by the source base station, the data packet that include the flow identifier, refer to the related content in the embodiment shown in FIG. 5. Details are not described herein again.

S608. The terminal accesses the target base station.

S609. The target base station performs path switching.

Optionally, the method further includes: notifying, by the target base station, a control plane management network element of a core network to notify a user plane network element to send a subsequent data packet related to the terminal to the target base station.

Optionally, in an implementation of this application, after the terminal is handed over to the target base station, the method further includes: S610. The terminal performs data communication with the target base station.

The data communication includes uplink data transmission and/or downlink data transmission.

Specifically, in an uplink data transmission process or a downlink data transmission process, forwarded data packets received via different types of tunnels are transmitted in different manners. This is not specially limited in this embodiment of this application. In addition, in the downlink data transmission process, the target base station may send, to the terminal, the forwarded data packet in the downlink direction and another downlink data packet received from the core network. In the uplink data transmission process, the target base station may send, to the core network, the forwarded data packet in the uplink direction and another uplink data packet received from the terminal. Transmission of the forwarded data packet takes precedence over that of the another uplink data packet received from the terminal or the another downlink data packet received from the core network. Optionally, the uplink data packet and the downlink data packet may be carried on a same DRB. In other words, a bidirectional DRB provides an uplink service and a downlink service. Alternatively, the uplink data packet and the downlink data packet may be carried on different DRBs.

In the downlink direction, the target base station may send, to the terminal on the first DRB or the second DRB, downlink data packets that include the forwarded data packets.

For example, when the data packets for forwarding are sent to the target base station via one DRB-based tunnel and one tunnel established based on a session, a specific manner in which the target base station sends the data packets to the terminal may include the following:

If the second mapping relationship is the same as the first mapping relationship, the target base station may send the forwarded data packets to the terminal on the first DRB, and then, after completing sending of the forwarded data packets, send, still on the first DRB, another downlink data packet received from the core network via an SDAP layer.

If the second mapping relationship is different from the first mapping relationship, the target base station may send, to the terminal on the first DRB, a data packet received by the target base station via the tunnel established based on a DRB; and send, to the terminal on the second DRB, a data packet received by the target base station via the tunnel established based on a session.

Optionally, the target base station sends, to the terminal on the second DRB, a data packet in the forwarded data packets that includes a flow identifier, and the target base station sends, to the terminal on the first DRB, a data packet in the forwarded data packets that includes no flow identifier.

Optionally, the target base station may send, to the terminal on the first DRB, a PDCP SDU in the forwarded data packets, to which a sequence number is allocated, and the target base station sends, to the terminal on the second DRB, a PDCP SDU that includes a flow identifier and to which no sequence number is allocated. The target base station may further send an SDAP layer data packet of the source base station to the terminal on the second DRB. It may be understood that the first DRB may be used to transmit a data packet that has a flow identifier or a data packet that has no flow identifier. Therefore, any PDCP SDU that has a sequence number can be transmitted on the first DRB regardless of whether the PDCP SDU includes a flow identifier.

Optionally, the source base station may allocate a sequence number to a PDCP SDU that is cached at the PDCP layer and to which no sequence number is allocated, and send, to the target base station as some of the data packets for forwarding via the tunnel established based on a DRB, the PDCP SDU to which the sequence number is allocated. Then, in a subsequent communication process, the target base station may directly transmit, on the first DRB, the PDCP SDU to which the sequence number is allocated, without allocating a sequence number to the PDCP SDU. This simplifies a procedure and improves transmission efficiency.

For another example, when the data packets for forwarding are sent to the target base station via a tunnel established based on a session, the target base station may route, to the first DRB via an SDAP entity, a PDCP layer data packet in the data packets to which a sequence number is allocated, and send, to the terminal on the first DRB, the PDCP layer data packet to which the sequence number is allocated. The target base station routes, to the second DRB via the SDAP entity, remaining data packets such as a data packet cached at an SDAP layer and/or a PDCP layer data packet to which no sequence number is allocated, and sends the remaining data packets to the terminal on the second DRB. Optionally, the SDAP entity may determine a plurality of second DRBs based on the mapping relationship between a flow and a DRB in the target base station, and send the remaining data packets on the plurality of second DRBs, to transmit the remaining data packets to the terminal. The PDCP layer data packet in the forwarded data packets to which the sequence number is allocated may carry an identifier of a third DRB, and the target base station may forward, to the corresponding first DRB based on a mapping relationship between the third DRB and the first DRB, the received data packet to which the sequence number is allocated.

For another example, when the data packets for forwarding are sent to the target base station via one or more tunnels established based on a DRB, a specific manner in which the target base station sends the data packets to the terminal includes the following:

If the first mapping relationship is the same as the second mapping relationship, the target base station sends, to the terminal on the first DRB, the data packets received by the target base station via the tunnel established based on a DRB, and then, after completing sending of the forwarded data packets, sends, by still using the first DRB, another data packet received from the core network via an SDAP layer.

Optionally, the source base station may allocate a sequence number to a PDCP SDU that is cached at the PDCP layer and to which no sequence number is allocated, and send, to the target base station as some of the data packets for forwarding, the PDCP SDU to which the sequence number is allocated. Details are not described.

If the first mapping relationship is different from the second mapping relationship, the target base station sends, to the terminal on the first DRB, a data packet that includes no flow identifier in the data packets received by the target base station via the tunnel established based on a DRB, and the target base station sends, to the terminal on the second DRB, a data packet that includes a flow identifier in the data packets received by the target base station via the tunnel established based on a DRB. Specifically, when two tunnels are established between the target base station and the source base station based on a DRB, a data packet transmitted via a tunnel established based on a third DRB of the source base station and the first DRB is transmitted on the first DRB, and a data packet transmitted via a tunnel established based on the DRB of the source base station and the second DRB is transmitted on the second DRB. When only one tunnel is established between the target base station and the source base station based on the third DRB of the source base station and the first DRB, the target base station may route, to the second DRB via an SDAP entity, a data packet in the received data packets that includes a flow identifier, and transmits the data packet on the second DRB. In this implementation, another data packet that includes no flow identifier is sent on the first DRB. In this implementation, the source base station may obtain a flow identifier of a data packet for forwarding in a manner in which an SDAP entity sends the flow identifier to the PDCP layer during a handover, and indicate, in the data packet for forwarding, that the flow identifier is used for the handover. Alternatively, the source base station may generate, in another flow identifier obtaining manner described in the embodiments of this application, flow identifiers for all PDCP layer data packets that have no PDCP SN, and forward, to the target base station, the data packets that include the flow identifier. Details are not described.

In this implementation, alternatively, the source base station may generate, in the various flow identifier obtaining manners described in this application, a flow identifier for a PDCP layer data packet to which no sequence number is allocated, and send, to the target base station, the data packet for forwarding that includes the flow identifier. Details are not described.

Optionally, if the forwarded data packets are PDCP layer data packets to which no sequence number is allocated, some of the data packets include flow a identifier, and a remaining data packet includes no flow identifier, the forwarded data packets are sent to the terminal on the first DRB. This can improve data packet transmission continuity and accuracy. A data packet of a non-access stratum flow that features in reflective QoS may be sent on the first DRB. The reflective QoS means that the flow features in uplink and downlink symmetry. To be specific, a flow in an uplink direction and a flow in a downlink direction have same QoS, and an uplink traffic flow template (traffic flow template, TFT) and a downlink traffic flow template are symmetric. For example, an uplink source address and source port number are a downlink destination address and destination port number, and an uplink destination address and destination port number are a downlink source address and source port number. In this scenario, the access network device adds a flow identifier to an air-interface data packet, and the terminal obtains, based on the received flow identifier and 5-tuple information of the downlink data packet, QoS of a flow in an uplink direction and a corresponding TFT.

In the uplink direction, the terminal may send, to the target base station on the first DRB or the second DRB, uplink data packets that include the forwarded data packets.

Optionally, the uplink data packets sent by the terminal to the target base station include data packets that need continuous uplink transmission, such as a PDCP SDU that fails to be transmitted by the terminal on the DRB of the source base station and to which a sequence number is allocated, and a PDCP SDU that fails to be transmitted by the terminal on the DRB of the source base station and to which no sequence number is allocated. All the uplink data packets include flow identifiers.

Optionally, the target base station receives the uplink data packets from the first DRB. Specifically, if the first mapping relationship is the same as the second mapping relationship, the terminal may continue to send a PDCP layer data packet on the first DRB. The PDCP layer data packet includes the unsuccessfully transmitted PDCP SDU to which the sequence number is allocated, and/or the unsuccessfully transmitted PDCP SDU to which no sequence number is allocated.

Optionally, the source base station sends a status report (status report) to the terminal, and the terminal determines a to-be-sent data packet based on the status report. The status report may be a PDCP status report that indicates a receiving status of a PDCP SDU on the reflect DRB of the target base station and that is used to notify the terminal to send a PDCP SDU that is incorrectly received on a receiving side. If the target base station does not send the PDCP status report, the terminal may send all cached PDCP SDUs on the reflect DRB.

If the first mapping relationship is different from the second mapping relationship, the terminal may continue to send, on the first DRB, all data packets such as a PDCP SDU that is cached at a PDCP layer and to which a sequence number is allocated, and/or a PDCP SDU that is cached at the PDCP layer and to which no sequence number is allocated. After the terminal completes sending of the PDCP layer data packets, an SDAP entity may route, to the second DRB for sending, another data packet such as a data packet cached at an SDAP layer. A PDCP entity of the terminal may notify the SDAP entity of the target base station that data packet sending is completed.

Optionally, the target base station receives the uplink data packets from the second DRB. The receiving manner is applicable to a scenario in which the first mapping relationship is different from the second mapping relationship. Specifically, the terminal may sequentially send, to an SDAP entity, PDCP layer data packets corresponding to DRBs, including the unsuccessfully transmitted PDCP SDU to which a sequence number is allocated and/or the unsuccessfully transmitted PDCP SDU to which no sequence number is allocated. The sequential sending means sending the data packets to an SDAP layer in a sequence of receiving the data packets by a PDCP layer from the SDAP layer. The SDAP entity is established based on a session, and all the data packets sent to the SDAP entity include a flow identifier. The PDCP PDUs include a data packet that has been successfully received by the target base station. The PDCP entity of the terminal corresponding to the DRB of the target base station performs an operation such as sequence number removal or decryption on the PDCP PDUs, to convert the PDCP PDUs into PDCP SDUs. Alternatively, the SDAP entity that is of the terminal and that is corresponding to the DRB of the target base station removes sequence numbers of the PDCP PDUs. The SDAP entity of the terminal routes, to a corresponding DRB (namely, the second DRB) based on the second mapping relationship, the data packets received from the PDCP layer. The SDAP entity first sends, to the second DRB, the data packets received from the PDCP layer, and then sends, to the second DRB, a data packet received from an upper layer. It may be understood that in this scenario, the target base station and the second access network device may not perform a data forwarding process in the uplink direction.

Optionally, the target base station receives, from the first DRB, a PDCP layer data packet to which a sequence number is allocated in the uplink data packets, and receives, from the second DRB, a PDCP layer data packet to which no sequence number is allocated in the uplink data packets and/or an SDAP layer data packet in the uplink data packets. The receiving manner is applicable to a scenario in which the first mapping relationship is different from the second mapping relationship. Specifically, the terminal may continue to send, on the first DRB, the unsuccessfully transmitted PDCP SDU to which the sequence number is allocated. The source base station may send a status report to the terminal, and the terminal determines a to-be-sent data packet based on the status report. Details are not described. In addition, the terminal may sequentially send the PDCP SDUs to an SDAP entity. All the data packets sent to the SDAP entity include flow identifiers. The SDAP entity routes, to a corresponding DRB based on the second mapping relationship, the data packets received from a PDCP layer. The SDAP entity first sends, to the corresponding DRB, the data packets received from the PDCP layer, and then sends, to the corresponding DRB, a data packet received from an upper layer.

In an implementation of this application, when an unacknowledged mode (unacknowledged mode, UM) service such as a cell broadcast service or an IP call service is performed over an air interface, information about an air-interface transmission status of a data packet related to the service does not need to be transferred between the target base station and the source base station. Specifically, in the uplink direction, the source base station sends a successfully received data packet to the core network, without performing data forwarding. The terminal accesses the target base station, and the terminal transmits a data packet on the new DRB based on the second mapping relationship configured by the target base station. This scenario is applicable to a scenario in which the first mapping relationship is the same as or different from the second mapping relationship. In the downlink direction, the source base station forwards, to the target base station, a data packet has not been transmitted and a new data packet received from the core network. Compared with an acknowledged mode (acknowledged mode, AM) service, in the unacknowledged mode service, a data packet for forwarding does not include a PDCP SDU that is on the DRB of the source base station and to which a sequence number is allocated. In other words, the source base station does not need to send, to the target base station, a PDCP SDU unsuccessfully sent on the DRB of the source base station. Other behavior of the target base station or the source base station is consistent with that in a downlink data transmission process in an AM mode. Details are not described.

Optionally, after receiving the uplink data packets, the target base station first delivers, in ascending order of PDCP SNs to the core network, PDCP SDUs that are in the uplink data packets and to which sequence numbers are allocated, and then delivers, to the core network, the PDCP SDU that is in the uplink data packets and to which no sequence number is allocated.

In an implementation of this application, in a process of transmitting the data packets in the downlink direction or the uplink direction, data packets that belong to a same flow may be transmitted on different DRBs. For example, some data packets in the same flow are transmitted on the reflect DRB, and a remaining data packet is transmitted on the new DRB. The reflect DRB and the new DRB are distinguished only in a time dimension. For example, a data packet first transmitted to the target base station is transmitted on the reflect DRB, and a data packet later transmitted to the target base station is transmitted on the new DRB. In this case, the data packets in the same flow can be sequentially transmitted in either of the following manners.

Optionally, a transmit end controls a data packet transmission sequence. Specifically, after sending of forwarded data packets on the first DRB is completed, the second DRB is instructed to send another data packet. Optionally, a PDCP entity corresponding to the first DRB may notify a PDCP entity corresponding to the second DRB. If the first DRB includes data packets of a plurality of flows, the first DRB may notify to a second DRB to which each flow maps. Alternatively, after sending of forwarded data packets on the first DRB is completed, an SDAP entity is notified. For example, a PDCP entity of the first DRB may notify the corresponding SDAP entity that the sending of the forwarded data packets is completed. If the PDCP entity corresponding to the first DRB can learn a flow identifier, the PDCP entity may notify the corresponding SDAP entity that sending of data packets that are in the forwarded data packets and that belong to one flow is completed. If the SDAP entity learns that the forwarded data packets sent by the PDCP entity are successfully sent, the SDAP entity starts to route a data packet of a corresponding flow to the corresponding second DRB, and the data packet of the corresponding flow is an SDAP layer data packet in a flow whose sending is completed on the first DRB.

Optionally, a receive end controls a data packet transmission sequence. Specifically, the receive end receives data packets in a same flow from the first DRB and the second DRB, and the receive end may distinguish between the data packets from the different DRBs based on an end marker, to sort the data packets received from the different DRBs. For example, the receive end first delivers, to an upper-layer protocol layer entity, a data packet that is of the flow and that is received from the first DRB, and then delivers, to the upper-layer protocol layer entity, a data packet that is of the flow and that is received from the second DRB. The end marker is used to indicate that data packet transmission on the first DRB ends. The end marker may be an independent data packet or control packet, for example, an independent SDAP layer or PDCP layer data packet or control packet. Alternatively, the end marker may indicate that a specific data packet such as a PDCP PDU is an end marker.

It may be understood that in the downlink direction, the transmit end is a network side, for example, the target base station, and the receive end is a terminal side; and in the uplink direction, the transmit end is a terminal side, and the receive end is a network side, for example, the target base station.

In an implementation of this application, if the PDCP layer of the source base station obtains no flow identifier of the data packets, the data packets for forwarding sent by the source base station to the target base station include no flow identifier. In this scenario, in the downlink direction, the target base station may send the data packets to the terminal in any one of the following manners:

When the data packets for forwarding are sent to the target base station via one or more tunnels established based on a DRB, the target base station may send the forwarded data packets to the terminal on the first DRB (namely, the reflect DRB), and then, after completing sending of the forwarded data packets, send, by still using the first DRB, another data packet received from the core network via the SDAP layer. It may be understood that the sending method is applicable to either a scenario in which the first mapping relationship is the same as the second mapping relationship or a scenario in which the first mapping relationship is different from the second mapping relationship.

When the data packets for forwarding are sent to the target base station via one DRB-based tunnel and one tunnel established based on a session, the tunnel established based on a session may be used to transmit the data packet cached at the SDAP layer, and the tunnel established based on a DRB may be used to transmit the data packet cached at the PDCP layer. Specifically, if the second mapping relationship is the same as the first mapping relationship, the target base station may send the forwarded data packets to the terminal on the first DRB (reflect DRB), and then, after completing sending of the forwarded data packets, send, by still using the first DRB, another data packet received from the core network via the SDAP layer. If the second mapping relationship is different from the first mapping relationship, all forwarded data packets on the DRB-based tunnel are sent on the corresponding reflect DRB of the target base station. The SDAP entity of the target base station may route, to the new DRB, all forwarded data packets received from the tunnel established based on a session, and send the data packets on the new DRB.

Optionally, the source base station may allocate a sequence number to a PDCP SDU cached at the PDCP layer, and send, to the target base station as some of the data packets for forwarding, the PDCP SDU to which the sequence number is allocated. Details are not described.

When the data packets for forwarding are sent to the target base station via one tunnel established based on a session, the target base station routes the forwarded data packets to the second DRB based on the second mapping relationship, and sends the data packets. The receive end discards all out-of-order data packets. Further, the receive end may notify the target base station of an initial sequence number of a discarded data packet or a sequence number of a last data packet delivered to the core network. In this scenario, the target base station may not establish the reflect DRB. The forwarded data packets are all data packets after an identified PDCP layer data packet, and the identified data packet is used to indicate that the transmit end no longer sends a data packet before the data packet, but the transmit end repeatedly sends the data packets after the data packet.

According to the data transmission method provided in this embodiment of this application, in the downlink direction, the data packets for forwarding are transmitted via different types of tunnels, and the forwarded data packets are sent to the terminal in transmission manners corresponding to the tunnel types. In the uplink direction, the terminal sends the uplink data packets to the network side on different DRBs. In this embodiment of this application, various flexible data packet transmission manners are provided, and a data packet transmission manner can be selected based on an actual network status, to avoid the following problem: In a handover or dual connectivity or another scenario, a data packet is lost or is repeatedly transmitted because each base station independently configures a mapping relationship between a flow and a DRB. This improves terminal service continuity and improves communication quality.

Figure 7:
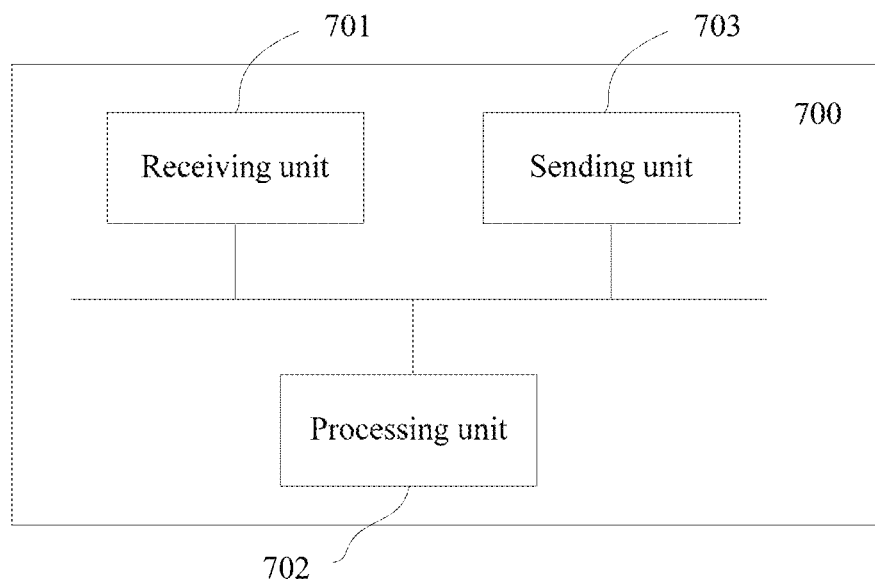
FIG. 7 is a schematic structural diagram of an access network device 700 according to an embodiment of this application.

FIG. 7 is a schematic structural diagram of an access network device 700 according to an embodiment of this application.

The access network device 700 is applicable to the communications system shown in FIG. 1. The access network device 700 may perform the operations performed by the first access network device in the embodiment shown in FIG. 2 or FIG. 5 or the target base station in the embodiment shown in FIG. 6.

As shown in FIG. 7, the access network device 700 includes a receiving unit 701 and a processing unit 702.

The receiving unit 701 is configured to receive forwarded data packets (or a forwarded data packet) from a second access network device.

Optionally, in a handover scenario, the access network device 700 is a target base station, and the second access network device is a source base station.

Optionally, in a dual connectivity scenario, the access network device 700 is a secondary base station, and the second access network device is a master base station; or the access network device 700 is a master base station, and the second access network device is a secondary base station.

The processing unit 702 is configured to map, to a first DRB, at least one data packet in the forwarded data packets that includes a flow identifier. The first DRB is corresponding to a DRB of the second access network device.

The first DRB and the DRB of the second access network device each meet a first mapping relationship, and the first mapping relationship is a mapping relationship between a flow and a DRB in the second access network device.

Optionally, the processing unit 702 is further configured to map, to the first DRB, a data packet in the forwarded data packets that includes no flow identifier.

Optionally, the processing unit 702 is further configured to map, to a second DRB based on a second mapping relationship, at least one data packet in the forwarded data packets that includes a flow identifier and that is other than the data packet mapped to the first DRB. The second mapping relationship is a mapping relationship between a flow and a DRB in the first access network device.

The first DRB is a reflect DRB that can maintain a transmission status of the DRB of the second access network device. The second DRB is a new DRB that is established by the access network device 700 based on the mapping relationship that is between a flow and a DRB and that is configured by the access network device 700, namely, the second mapping relationship.

It may be understood that the first DRB may be used to transmit a data packet that includes a flow identifier or a data packet that includes no flow identifier, and the second DRB may be used to transmit a data packet that includes a flow identifier.

For detailed descriptions of the first DRB, the second DRB, the first mapping relationship, and the second mapping relationship, refer to the related content in another embodiment of this application. Details are not described again.

Optionally, the processing unit 702 is further configured to release the first DRB after data packet sending on the first DRB is completed. For detailed descriptions, refer to the related content in another embodiment of this application. Details are not described again.

Optionally, in an implementation of this application, the receiving unit 701 is specifically configured to receive the forwarded data packets from the second access network device via a tunnel established based on a DRB and a tunnel established based on a session. The tunnel established based on a DRB may be used to transmit a PDCP layer data packet that is of the second access network device and to which a sequence number is allocated. The tunnel established based on a session may be used to transmit an SDAP layer data packet of the second access network device, and/or the tunnel established based on a session is used to transmit a PDCP layer data packet that is of the second access network device, that includes a flow identifier, and to which no sequence number is allocated. Then, the processing unit 702 may map, to the first DRB, a data packet received via the tunnel established based on a DRB, and map, to the second DRB, a data packet received via the tunnel established based on a session.

Optionally, in an implementation of this application, the receiving unit 701 is specifically configured to receive the forwarded data packets from the second access network device via one or more tunnels established based on a DRB. Then, the processing unit 702 may map, to the first DRB, the data packet in the received forwarded data packets that includes no flow identifier, and map, to the second DRB, the data packet in the forwarded data packets that includes a flow identifier.

Optionally, in an implementation of this application, the receiving unit 701 is specifically configured to receive, from the second access network device via a tunnel established based on a session, the data packet in the forwarded data packets that includes a flow identifier. Then, the processing unit 702 may route, to the first DRB via an SDAP entity, a PDCP layer data packet that is in the forwarded data packets and to which a sequence number is allocated, and route, to the second DRB, a PDCP layer data packet to which no sequence number is allocated or the SDAP layer data packet.

Optionally, the access network device 700 further includes a sending unit 703, configured to send, to a terminal on the first DRB or on the first DRB and the second DRB, downlink data packets that include the forwarded data packets. For example, the sending unit 703 is configured to: send, to the terminal on the first DRB, the PDCP layer data packet that is in the forwarded data packets and to which a sequence number is allocated, and send, to the terminal on the second DRB, the PDCP layer data packet that is in the forwarded data packets and to which no sequence number is allocated.

For detailed descriptions of receiving the forwarded data packets via different types of tunnels and detailed descriptions of downlink data transmission manners corresponding to the different types of tunnels, refer to the related content in another embodiment of this application. Details are not described herein again.

Figure 8:
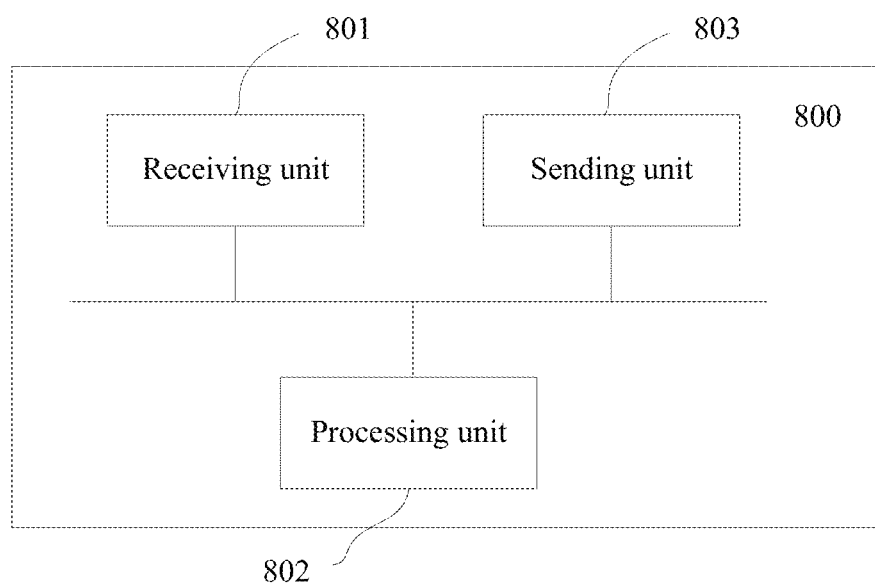
FIG. 8 is a schematic structural diagram of an access network device 800 according to an embodiment of this application.

FIG. 8 is a schematic structural diagram of an access network device 800 according to an embodiment of this application.

The access network device 800 is applicable to the communications system shown in FIG. 1. The access network device 800 may perform the operations performed by the first access network device in the embodiment shown in FIG. 3 or FIG. 5 or the target base station in the embodiment shown in FIG. 6.

The access network device 800 includes:

a receiving unit 801, configured to receive forwarded data packets (or a forwarded data packet) from a second access network device; and a processing unit 802, configured to: map, to a first data radio bearer DRB, a data packet in the forwarded data packets that includes no flow identifier, where the first DRB is corresponding to a DRB of the second access network device; and map, to a second DRB based on a second mapping relationship, a data packet in the forwarded data packets that includes a flow identifier, where the second mapping relationship is a mapping relationship between a flow and a DRB in the first access network device.

The first DRB and the DRB of the second access network device each meet a first mapping relationship, and the first mapping relationship is a mapping relationship between a flow and a DRB in the second access network device.

For detailed descriptions of the first DRB, the second DRB, the first mapping relationship, and the second mapping relationship, refer to the related content in another embodiment of this application. Details are not described again.

Optionally, the processing unit 802 is further configured to route, via an SDAP entity to the second DRB, the data packet in the forwarded data packets that includes a flow identifier.

Optionally, in an implementation of this application, the access network device 800 further includes a sending unit 803, configured to: send, to a terminal on the first DRB, a data packet in the forwarded data packets that includes no flow identifier and to which a sequence number is allocated; and send, to the terminal on the second DRB, a data packet in the forwarded data packets that includes a flow identifier and to which no sequence number is allocated.

Optionally, the processing unit 802 is further configured to release the first DRB after data packet sending on the first DRB is completed. For detailed descriptions, refer to the related content in another embodiment of this application. Details are not described again.

Optionally, in an implementation of this application, the receiving unit 801 receives the forwarded data packets via a tunnel between the access network device 800 and the second access network device. In a downlink direction, the tunnel between the first access network device and the second access network device may be established in different manners. For detailed descriptions of receiving the forwarded data packets via different types of tunnels and detailed descriptions of downlink data transmission manners corresponding to the different types of tunnels, refer to the related content in another embodiment of this application. Details are not described herein again.

Figure 9:
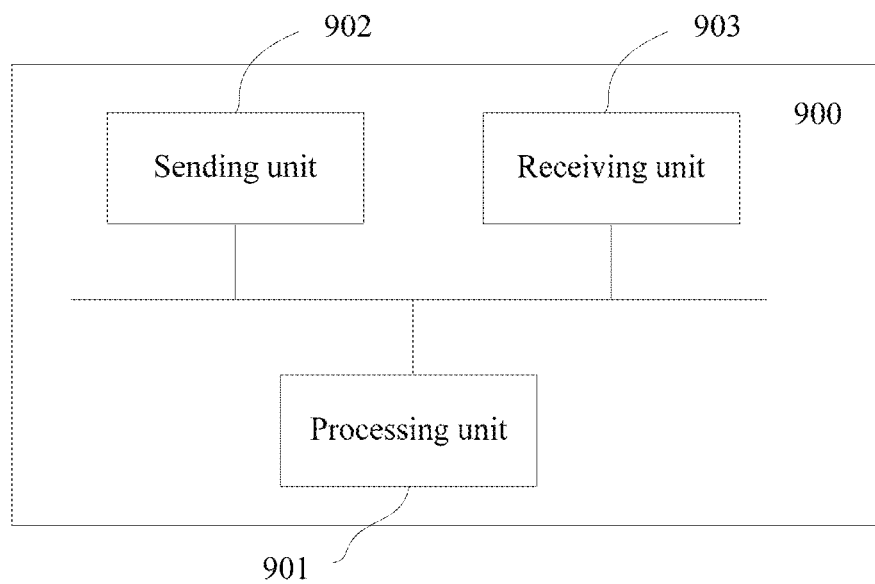
FIG. 9 is a schematic structural diagram of an access network device 900 according to an embodiment of this application.

FIG. 9 is a schematic structural diagram of an access network device 900 according to an embodiment of this application.

The access network device 900 is applicable to the communications system shown in FIG. 1. The access network device 900 may perform the operations performed by the second access network device in any one of the embodiments shown in FIG. 2 to FIG. 5 or the source base station in the embodiment shown in FIG. 6.

The access network device 900 includes:

a processing unit 901, configured to generate a data packet for forwarding that includes a flow identifier (or data packets for forwarding that include flow identifiers); and a sending unit 902, configured to send, to a first access network device, the data packet for forwarding that includes a flow identifier (or data packets for forwarding that include flow identifiers).

Optionally, in a downlink direction, the data packet for forwarding includes at least one type of the following data packets: a PDCP layer data packet that is of the second access network device, to which a sequence number is allocated, and for which no reception acknowledgement is obtained from a terminal; a PDCP layer data packet that is of the second access network device and to which no sequence number is allocated; and a Service Data Adaptation Protocol SDAP layer data packet of the second access network device.

Optionally, in the downlink direction, the sending unit 902 may be further configured to send, to the first access network device, a data packet for forwarding that includes no flow identifier.

Optionally, in the downlink direction, the sending unit 902 may be configured to send the data packet for forwarding to the first access network device via different types of tunnels. For detailed descriptions of various tunnels and transmission of the data packet for forwarding in the various tunnels, refer to the related content in another embodiment of this application. Details are not described herein again.

Optionally, in an implementation of this application, in the downlink direction, the processing unit may be further configured to obtain a flow identifier via a PDCP entity, to add the flow identifier to the data packet for forwarding, and generate the data packet for forwarding that includes the flow identifier, and then the first access network device parses the forwarded data packet to obtain the flow identifier. For detailed descriptions of how to generate the data packet that includes a flow identifier, refer to the related content in the embodiment shown in FIG. 5. Details are not described herein again.

Optionally, in an uplink direction, the data packet for forwarding includes an out-of-order data packet received from the terminal. The access network device 900 may receive the out-of-order data packet by using a receiving unit 903. All data packets for forwarding in the uplink direction include flow identifiers. The sending unit 902 may send the data packets for forwarding in the uplink direction to the first access network device via a tunnel established based on a DRB. Details are not described herein.

Figure 10:
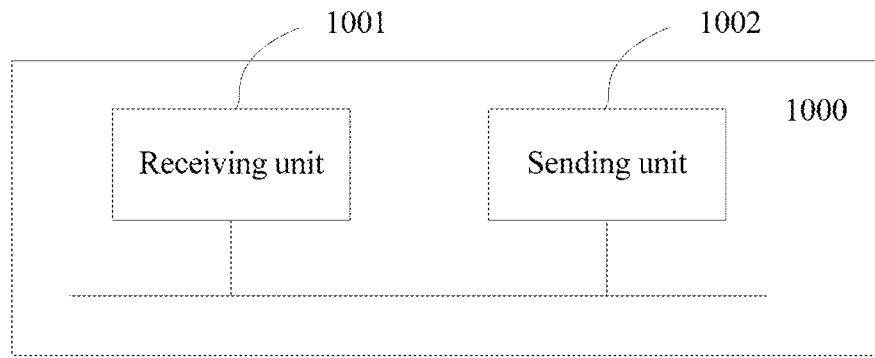
FIG. 10 is a schematic structural diagram of an access network device 1000 according to an embodiment of this application.

FIG. 10 is a schematic structural diagram of an access network device 1000 according to an embodiment of this application.

The access network device 1000 is applicable to the communications system shown in FIG. 1. The access network device 1000 may perform the operations performed by the first access network device in the embodiment shown in FIG. 4 or the operations performed by the target base station in the embodiment shown in FIG. 6.

The access network device 1000 includes:

a receiving unit 1001, configured to receive a forwarded data packet (or forwarded data packets) from a second access network device, where the forwarded data packet includes a flow identifier, and the forwarded data packet includes an out-of-order data packet received by the second access network device from a terminal; and a sending unit 1002, configured to send the received forwarded data packet to a core network device.

Optionally, the receiving unit 1001 receives the forwarded data packet via a tunnel between the access network device 1000 and the second access network device. The tunnel may be a tunnel that is established between the first access network device and the second access network device based on a DRB. For the tunnel, refer to the related descriptions of the tunnel established based on a DRB in another embodiment of this application. Details are not described again.

The receiving unit 1001 is further configured to receive uplink data packets from the terminal. The uplink data packets include at least one type of the following data packets: a PDCP layer data packet that is unsuccessfully sent by the terminal to the second access network device and to which a sequence number is allocated; a PDCP layer data packet that is of the terminal and to which no sequence number is allocated; and an SDAP layer data packet of the terminal.

Optionally, the receiving unit 1001 is specifically configured to receive the uplink data packets on a first DRB.

Optionally, the receiving unit 1001 is specifically configured to receive the uplink data packets on a second DRB.

Optionally, the receiving unit 1001 is specifically configured to: receive, on a first DRB, a PDCP layer data packet that is of the terminal and to which a sequence number is allocated in the uplink data packets; and receive, on a second DRB, the PDCP layer data packet that is of the terminal and to which no sequence number is allocated in the uplink data packets and/or the SDAP layer data packet of the terminal in the uplink data packets.

Optionally, the receiving unit 1001 is specifically configured to: receive, on a first DRB, a PDCP layer data packet of the terminal in the uplink data packets; and receive, on a second DRB, the SDAP layer data packet of the terminal in the uplink data packets.

The first DRB is a reflect DRB. The second DRB is a new DRB. For detailed descriptions of the first DRB and the second DRB, refer to the related content in another embodiment of this application. Details are not described again.

Figure 11:
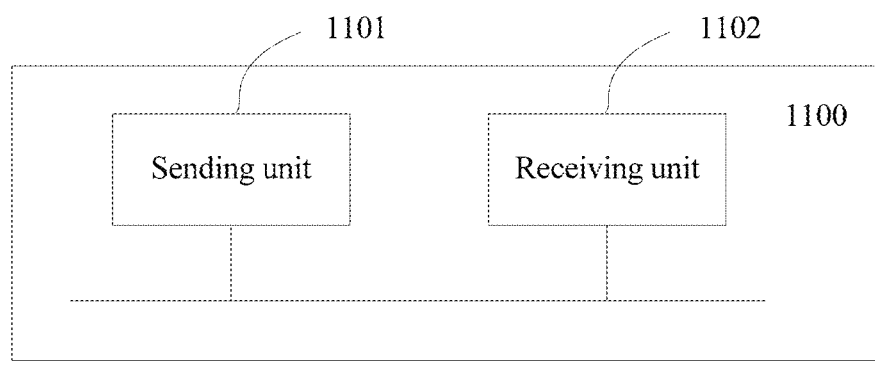
FIG. 11 is a schematic structural diagram of a terminal 1100 according to an embodiment of this application.

FIG. 11 is a schematic structural diagram of a terminal 1100 according to an embodiment of this application.

The terminal 1100 is applicable to the communications system shown in FIG. 1. The terminal 1100 may perform the operations performed by the terminal in any one of the embodiments shown in FIG. 2 to FIG. 6.

The terminal 1100 includes:

a sending unit 1101, configured to send uplink data packets to an access network device, where the uplink data packets include flow identifiers; and/or a receiving unit 1102, configured to receive downlink data packets from the access network device, where at least one of the downlink data packets includes a flow identifier.

The downlink data packets include a forwarded data packet (or forwarded data packets) in a downlink direction. For specific content of the forwarded data packet, refer to the related descriptions in another embodiment of this application. Details are not described herein again.

Optionally, the sending unit 1101 is specifically configured to send the uplink data packets to the access network device on a first DRB.

Optionally, the sending unit 1101 is specifically configured to send the uplink data packets to the access network device on a second DRB.

Optionally, the sending unit 1101 is specifically configured to: send, to the access network device on a first DRB, a PDCP layer data packet that is in the uplink data packets and to which a sequence number is allocated; and send, to the access network device on a second DRB, a PDCP layer data packet to which no sequence number is allocated in the uplink data packets and/or an SDAP layer data packet in the uplink data packets. The PDCP layer data packet transmitted on the first DRB may be a data packet that includes a flow identifier, or may be a data packet that includes no flow identifier.

Optionally, the sending unit 1101 is specifically configured to: send a PDCP layer data packet in the uplink data packets to the access network device on a first DRB; and send an SDAP layer data packet in the uplink data packets to the access network device on a second DRB. The PDCP layer data packet includes a data packet to which a sequence number is allocated and a data packet to which no sequence number is allocated.

Optionally, the receiving unit 1102 is specifically configured to receive the downlink data packets from the access network device on the first DRB.

Optionally, the receiving unit 1102 is specifically configured to receive, from the access network device on the second DRB, a downlink data packet that includes a flow identifier.

Optionally, the receiving unit 1102 is specifically configured to: receive, from the access network device on the first DRB, a data packet in the downlink data packets that includes no flow identifier; and receive, from the access network device on the second DRB, a data packet in the downlink data packets that includes a flow identifier.

Optionally, the receiving unit 1102 is specifically configured to: receive, from the access network device on the first DRB, a PDCP layer data packet that is in the downlink data packets and to which a sequence number is allocated; and receive, from the access network device on the second DRB, a PDCP layer data packet that includes a flow identifier and to which no sequence number is allocated in the downlink data packets and an SDAP layer data packet in the downlink data packets.

The first DRB is a reflect DRB. The second DRB is a new DRB. For detailed descriptions of the first DRB and the second DRB, refer to the related content in another embodiment of this application. Details are not described again.

The access network device is an access network device that has been accessed by the terminal. When the access network device is an access network device accessed by the terminal after a handover or is an access network device that receives offloaded data in a dual connectivity process, the downlink data packets include a forwarded data packet in a downlink direction and another downlink data packet received by the access network device from a core network. For detailed descriptions, refer to the related content in another embodiment of this application. Details are not described again.

Figure 12:
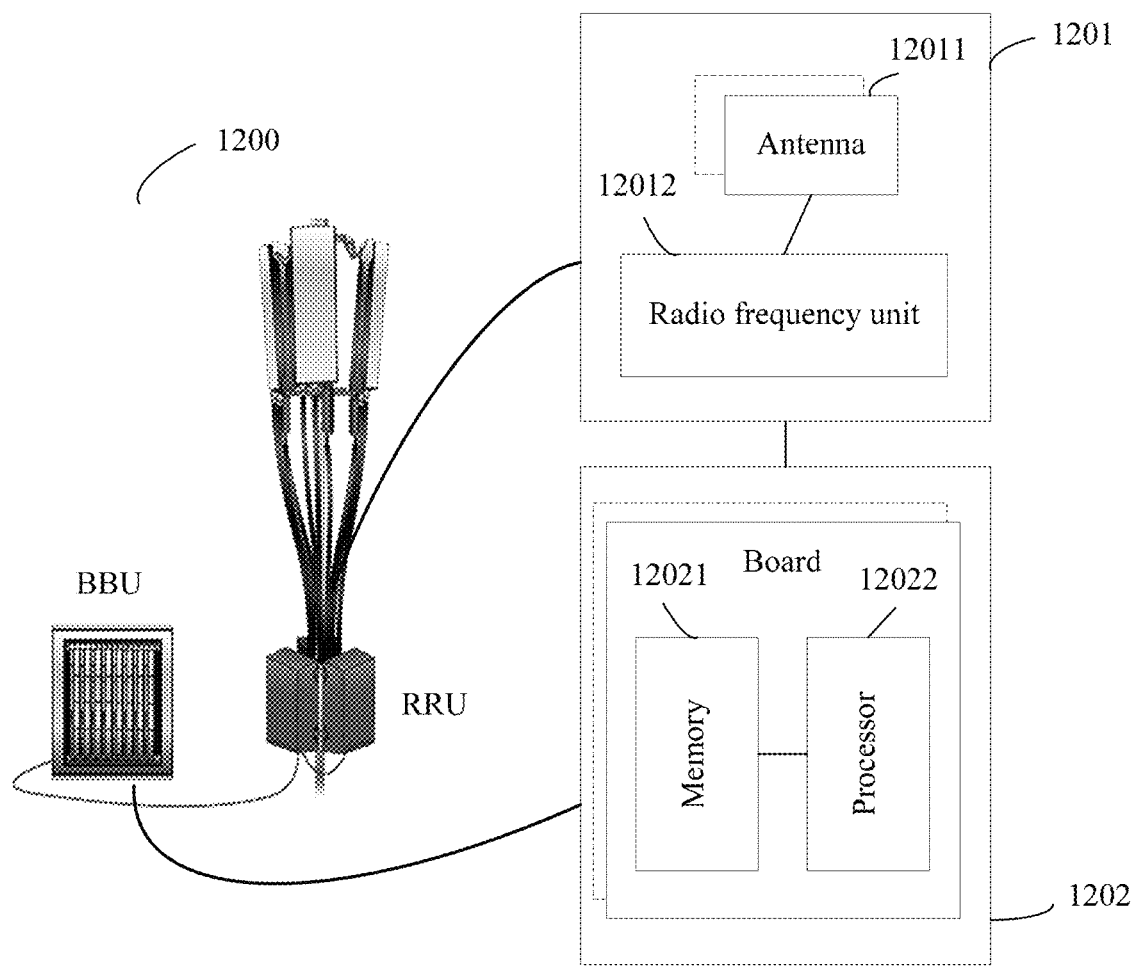
FIG. 12 is a schematic structural diagram of an access network device 1200 according to an embodiment of this application.

FIG. 12 is a schematic structural diagram of an access network device 1200 according to an embodiment of this application.

The access network device 1200 is applicable to the communications system shown in FIG. 1. The access network device 1200 may perform the operations performed by the first access network device in any one of the embodiments shown in FIG. 2 to FIG. 5 or the target base station in the embodiment shown in FIG. 6.

The access network device 1200 includes one or more remote radio units (remote radio unit, RRU) 1201 and one or more baseband units (baseband unit, BBU) 1202. The RRU 1201 may be referred to as a transceiver unit, a transceiver, a transceiver circuit, a transceiver, or the like, and the RRU 1201 may include at least one antenna 12011 and a radio frequency unit 12012. The RRU 1201 is mainly configured to: transmit/receive a radio frequency signal, and perform conversion between the radio frequency signal and a baseband signal, for example, configured to send, to UE, information such as the signaling indication described in the foregoing method embodiments. The BBU 1202 is mainly configured to: perform baseband processing, control the access network device, and so on. The RRU 1201 and the BBU 1202 may be physically disposed together; or may be physically disposed separately, in other words, the access network device 1200 is a distributed access network device. When the access network device includes a CU and a DU, a function of the RRU may be implemented by the DU, and a function of the BBU may be implemented by the CU; or a function of the RRU and some functions of the BBU are implemented by the DU, and another function of the BBU is implemented by the CU; or some functions of the RRU are implemented by the DU, and another function of the RRU and a function of the BBU are implemented by the CU. This is not limited.

The BBU 1202 is a control center of the access network device, may also be referred to as a processing unit, and is mainly configured to complete a baseband processing function, such as channel coding, multiplexing, modulation, or spread spectrum. For example, the BBU may be configured to control the access network device 1200 to perform the operations performed by the first access network device in any one of the embodiments shown in FIG. 2 to FIG. 5 or the target base station in the embodiment shown in FIG. 6.

For example, the BBU 1202 may include one or more boards. A plurality of boards may jointly support a radio access network (for example, an NR access network) of a single access standard, or may support radio access networks of different access standards. The BBU 1202 further includes a memory 12021 and a processor 12022. The memory 12021 is configured to store necessary instructions and necessary data. For example, the memory 12021 stores a UE context in the foregoing embodiments. The processor 12022 is configured to control the access network device 1200 to perform necessary actions, for example, configured to control the access network device 1200 to perform the actions of the first access network device in any one of the embodiments shown in FIG. 2 to FIG. 4, or control the access network device 1200 to perform the actions of the target base station in the embodiment shown in FIG. 5. The memory 12021 and the processor 12022 may serve the one or more boards. In other words, a memory and a processor may be separately disposed on each board, or a plurality of boards may share a same memory and processor. In addition, a necessary circuit is further disposed on each board.

For example, the BBU 1202 further includes a communications unit 12023. The communications unit 12023 is configured to support the access network device 1200 in communicating with a network element such as another access network device or a core network device, for example, support the access network device 1200 in receiving a forwarded data packet from a second access network device. The communications unit 12023 may include a communications interface, for example, a communications interface between the access network device 1200 and the second access network device, or a communications interface between the access network device 1200 and the core network device.

Figure 13:
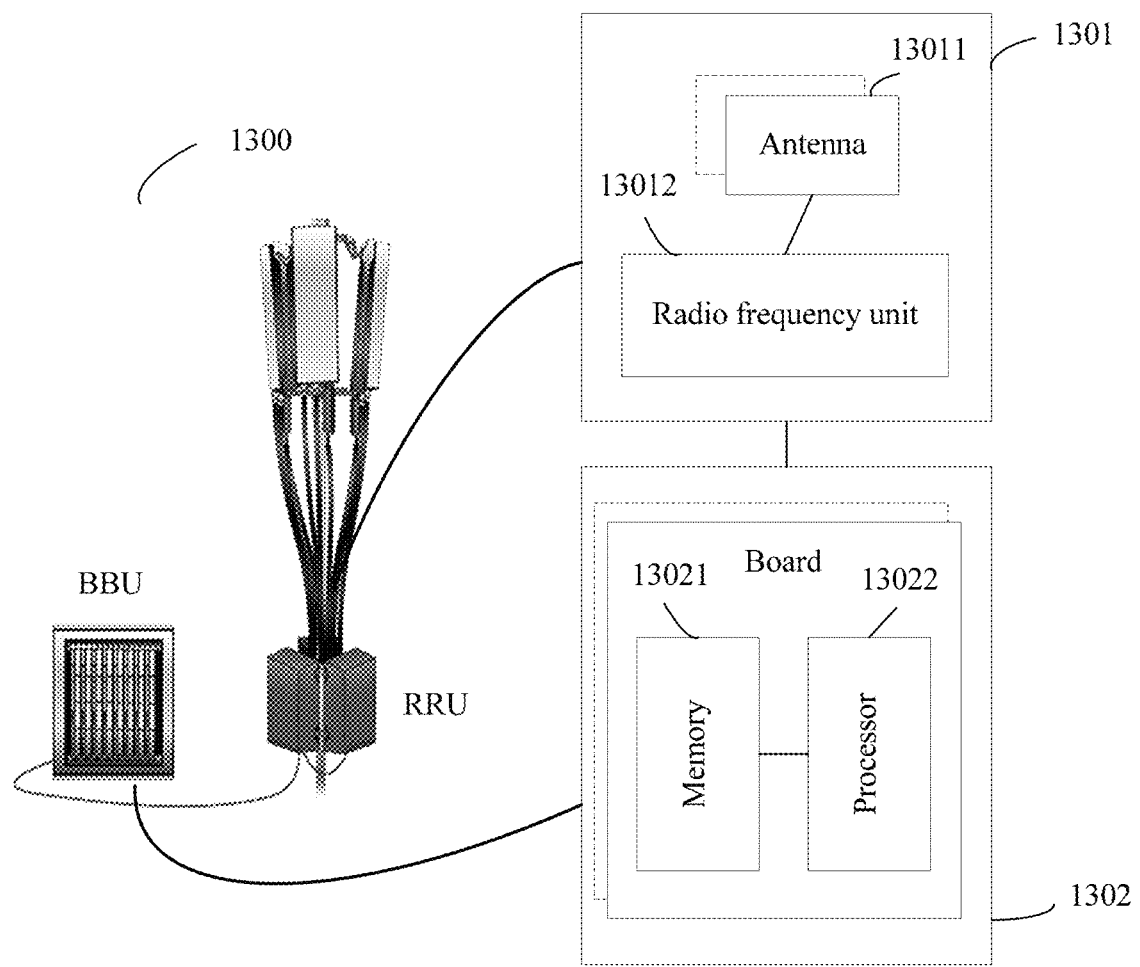
FIG. 13 is a schematic structural diagram of an access network device 1300 according to an embodiment of this application.

FIG. 13 is a schematic structural diagram of an access network device 1300 according to an embodiment of this application.

The access network device 1300 is applicable to the communications system shown in FIG. 1. The access network device 1300 may perform the operations performed by the second access network device in any one of the embodiments shown in FIG. 2 to FIG. 5 or the source base station in the embodiment shown in FIG. 6.

The access network device 1300 includes one or more RRUs 1301 and one or more BBUs 1302.

The BBU 1302 may be configured to control the access network device 1300 to perform the operations performed by the second access network device in the embodiments shown in FIG. 2 to FIG. 5, or control the access network device 1300 to perform the operations performed by the source access network device in the embodiment shown in FIG. 6.

For example, the BBU 1302 may include one or more boards. A plurality of boards may jointly support a radio access network (for example, an NR access network) of a single access standard, or may support radio access networks of different access standards. The BBU 1302 further includes a memory 13021 and a processor 13022. The memory 13021 is configured to store necessary instructions and necessary data. For example, the memory 13021 stores a UE context obtained from the first access network device in the foregoing embodiments. The processor 13022 is configured to control the access network device 1300 to perform necessary actions, for example, configured to control the access network device 1300 to perform the actions of the second access network device in the embodiments shown in FIG. 2 to FIG. 5, or control the access network device 1300 to perform the actions of the source base station in the embodiment shown in FIG. 6.

For example, the BBU 1302 further includes a communications unit 13023. The communications unit 13023 is configured to support the access network device 1300 in communicating with a network element such as another access network device or a core network device, for example, support the access network device 1300 in sending a data packet for forwarding to a first access network device. The communications unit 13023 may include a communications interface, for example, a communications interface between the access network device 1300 and the first access network device, or a communications interface between the access network device 1300 and the core network device.

For detailed descriptions of functions of the RRU and the BBU and detailed descriptions of functions of apparatuses such as the memory and the processor in the BBU, refer to the related content in the embodiment shown in FIG. 13. Details are not described herein again.

Figure 14:
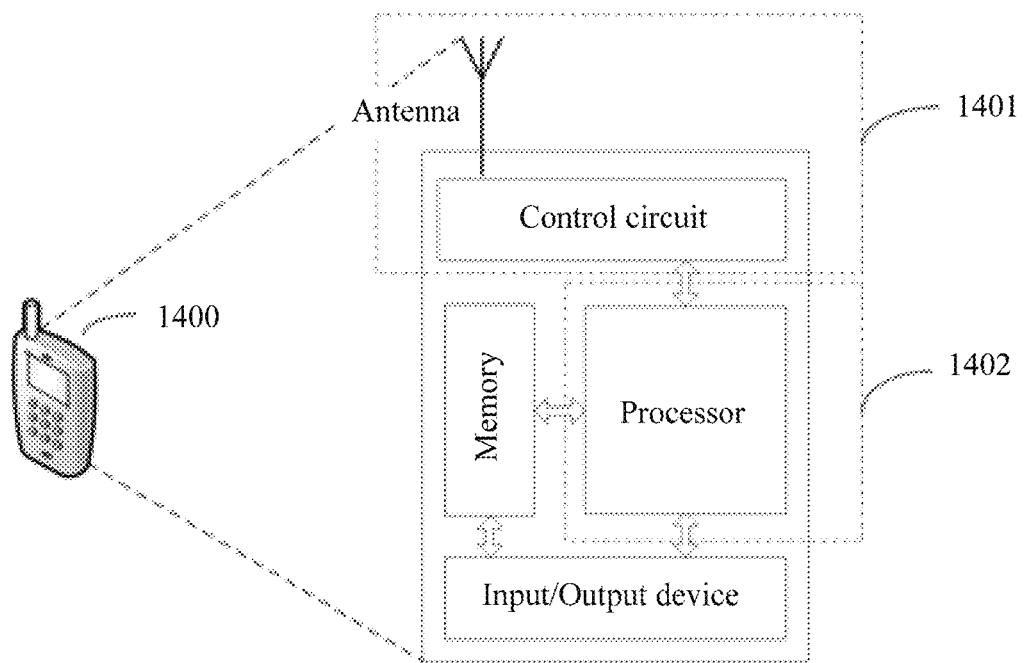
FIG. 14 is a schematic structural diagram of a terminal 1400 according to an embodiment of this application.

FIG. 14 is a schematic structural diagram of a terminal 1400 according to an embodiment of this application.

The terminal 1400 is applicable to the communications system shown in FIG. 1. The terminal 1400 may perform the operations performed by the terminal in any one of the embodiments shown in FIG. 2 to FIG. 6.

For ease of description, FIG. 14 shows only main components of the terminal. As shown in FIG. 14, the terminal 1400 includes a processor, a memory, a control circuit, an antenna, and an input/output apparatus. The processor is mainly configured to: process a communications protocol and communication data, control entire user equipment, execute a software program, and process data of the software program, for example, configured to support the terminal 1400 in performing the terminal actions described in FIG. 2 to FIG. 6. The memory is mainly configured to store the software program and the data, for example, store a terminal context described in the foregoing embodiments. The control circuit is mainly configured to: perform conversion between a baseband signal and a radio frequency signal, and process the radio frequency signal. The control circuit and the antenna may also be jointly referred to as a transceiver, mainly configured to transmit/receive a radio frequency signal in a form of an electromagnetic wave, for example, may be configured to: send an uplink data packet to an access network device, or receive a downlink data packet from an access network device. For details, refer to the related descriptions in the method embodiments. The input/output apparatus such as a touchscreen, a display screen, or a keyboard is mainly configured to: receive data entered by a user, and output data to the user.

After the terminal is powered on, the processor may read the software program in the storage unit, interpret and execute instructions of the software program, and process the data of the software program. When the processor needs to send data wirelessly, the processor outputs a baseband signal to a radio frequency circuit after performing baseband processing on the to-be-sent data. After performing radio frequency processing on the baseband signal, the radio frequency circuit sends a radio frequency signal in an electromagnetic wave form via the antenna. When data is sent to the terminal, the radio frequency circuit receives a radio frequency signal via the antenna, converts the radio frequency signal into a baseband signal, and outputs the baseband signal to the processor. The processor converts the baseband signal into data, and processes the data.

A person skilled in the art may understand that for ease of description, FIG. 14 shows only one memory and only one processor. Actually, the terminal may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to: control the entire terminal, execute the software program, and process the data of the software program. The processor in FIG. 14 integrates functions of the baseband processor and the central processing unit. A person skilled in the art may understand that the baseband processor and the central processing unit may alternatively be separate processors, and are interconnected via a technology such as a bus. A person skilled in the art may understand that the terminal may include a plurality of baseband processors to adapt to different network standards, and the terminal may include a plurality of central processing units to enhance a processing capability of the terminal. The components in the terminal may be connected via various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

Figure 15:
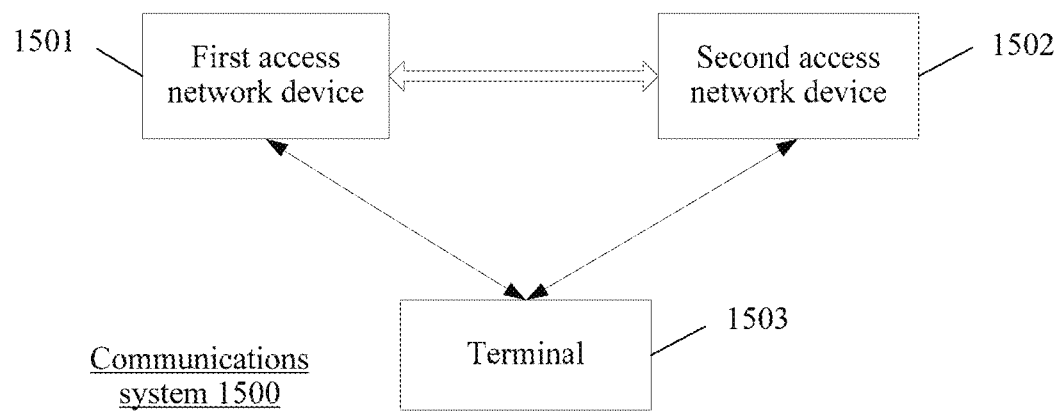
FIG. 15 is a schematic diagram of a communications system 1500 according to an embodiment of this application.

FIG. 15 is a schematic diagram of a communications system 1500 according to an embodiment of this application.

The communications system 1500 includes a first access network device 1501 and a second access network device 1502.

The first access network device 1501 may perform the operations performed by the first access network device in any one of the embodiments shown in FIG. 2 to FIG. 5, or perform the operations performed by the target base station in the embodiment shown in FIG. 6. For example, the first access network device may be the access network device in the embodiment shown in FIG. 7, FIG. 8, FIG. 10, or FIG. 12.

The second access network device 1502 may perform the operations performed by the second access network device in any one of the embodiments shown in FIG. 2 to FIG. 5, or perform the operations performed by the source base station in the embodiment shown in FIG. 6. For example, the second access network device may be the access network device in the embodiment shown in FIG. 9 or FIG. 13.

The communications system may further include a terminal 1503 that separately communicates with the first access network device 1501 and the second access network device 1502. The terminal 1503 may perform the operations performed by the terminal in any one of the embodiments shown in FIG. 2 to FIG. 6, and may be the terminal in the embodiment shown in FIG. 11 or FIG. 14.

A person skilled in the art may clearly understand that mutual reference may be made between the descriptions of the embodiments provided in this application. For example, for the purpose of convenient and brief description, for functions and execution steps of each apparatus and device provided in the embodiments of this application, refer to the related descriptions in the method embodiments of this application. Mutual reference may also be made between the method embodiments and between the apparatus embodiments.

All or some of the foregoing embodiments may be implemented by software, hardware, firmware, or any combination thereof. When being implemented by software, all or some of the foregoing embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (SSD)), or the like.

In the several embodiments provided in this application, it should be understood that the disclosed system, device, and method may be implemented in other manners without departing from the scope of this application. For example, the described embodiments are merely examples. For example, the module or unit division is merely logical function division and may be other division during actual implementation. For example, a plurality of units or components may be combined or integrated into another system, or some features may be ignored or not performed. The units described as separate parts may or may not be physically separate, and parts displayed as units may or may not be physical units, in other words, may be located in one position, or may be distributed on a plurality of network units. Some or all of the modules may be selected based on an actual requirement to achieve the objectives of the solutions in the embodiments. A person of ordinary skill in the art may understand and implement the embodiments of this application without creative efforts.

In addition, the described system, device, method, and schematic diagrams of different embodiments can be combined or integrated with another system, module, technology, or method without departing from the scope of this application. In addition, the displayed or discussed mutual couplings or direct couplings or communication connections may be implemented via some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication system, comprising:
a first access network device that establishes a data radio bearer (DRB)-based tunnel and a session-based tunnel with a second access network device, wherein the DRB-based tunnel is used to transmit a Packet Data Convergence Protocol (PDCP) layer data packet from the second access network device to the first access network device, and the session-based tunnel is used to transmit a Service Data Adaptation Protocol (SDAP) layer data packet from the second access network device to the first access network device; and
the second access network device that forwards data packets to the first access network device via the DRB-based tunnel and the session-based tunnel; and
the first access network device is configured to:
map a PDCP layer data packet on a DRB of the second access network device to a first DRB which is corresponding to the DRB of the second access network device;
send the PDCP layer data packet to a terminal on the first DRB; and
after sending the PDCP layer data packet to the terminal on the first DRB, send to the terminal on the first DRB, a data packet received from a core network.

2. The communication system according to claim 1, wherein a mapping relationship between a flow and the DRB of the second access network device is the same as a mapping relationship between the flow and the first DRB.

3. The communication system according to claim 1, wherein the first DRB and the DRB of the second access network device have a same PDCP sequence number (SN) status and a same hyper frame number (HFN) status.

4. The communication system according to claim 2, wherein the second access network device is configured to:

send the mapping relationship between the flow and the DRB of the second access network device to the first access network device.

5. The communication system according to claim 1, wherein the first access network device is configured to:
receive data packets of a flow from the terminal on the first DRB and a second DRB; and
after receiving an end marker from the terminal on the first DRB, send one or more data packets of the flow received on the second DRB to the core network.

6. The communication system according to claim 1, wherein:
the first access network device is a target access network device, and the second access network device is a source access network device; or
the first access network device is a master base station, and the second access network device is a secondary base station, both the master base station and the secondary base station connecting to a terminal; or
the first access network device is a secondary base station, and the second access network device is a master base station, both the master base station and the secondary base station connecting to a terminal.

7. A data transmission method, comprising:
establishing, by a first access network device, a data radio bearer (DRB)-based tunnel and a session-based tunnel with a second access network device;
forwarding, by the second access network device, data packets to the first access network device via the DRB-based tunnel and the session-based tunnel; and
receiving, by the first access network device, forwarded data packets from the second access network device via the DRB-based tunnel and the session-based tunnel; and
wherein the DRB-based tunnel is used to transmit a Packet Data Convergence Protocol (PDCP) layer data packet from the second access network device to the first access network device; and
wherein the session-based tunnel is used to transmit a Service Data Adaptation Protocol (SDAP) layer data packet from the second access network device to the first access network device, and the method further comprises:
mapping, by the first access network device, a PDCP layer data packet on a DRB of the second access network device to a first DRB which is corresponding to the DRB of the second access network device;
sending, by the first access network device, the PDCP layer data packet to a terminal on the first DRB; and
after sending the PDCP layer data packet to the terminal on the first DRB, sending, by the first access network device, to the terminal on the first DRB, a data packet received from a core network.

8. The method according to claim 7, wherein a mapping relationship between a flow and the DRB of the second access network device is the same as a mapping relationship between the flow and the first DRB.

9. The method according to claim 7, wherein the first DRB and the DRB of the second access network device have a same PDCP sequence number SN status and a same hyper frame number (HFN) status.

10. The method according to claim 8, further comprising:
sending, by the second access network device, the mapping relationship between the flow and the DRB of the second access network device to the first access network device; and receiving, by the first access network device, the mapping relationship between the flow and the DRB of the second access network device from the second access network device.

11. The method according to claim 7, further comprising:
receiving, by the first access network device, data packets of a flow from the terminal on the first DRB and a second DRB; and
after receiving an end marker from the terminal on the first DRB, sending, by the first access network device, one or more data packets of the flow received on the second DRB to the core network.

12. A data transmission method, comprising:
establishing, by a first access network device, a data radio bearer (DRB)-based tunnel and a session-based tunnel with a second access network device; and
receiving, by the first access network device, forwarded data packets from the second access network device via the DRB-based tunnel and the session-based tunnel;
wherein the DRB-based tunnel is used by the first access network device to receive a Packet Data Convergence Protocol (PDCP) layer data packet from the second access network device; and
wherein the session-based tunnel is used by the first access network device to receive a Service Data Adaptation Protocol (SDAP) layer data packet from the second access network device and the method further comprises:
mapping, by the first access network device, a PDCP layer data packet on a DRB of the second access network device to a first DRB which is corresponding to the DRB of the second access network device;
sending, by the first access network device, the PDCP layer data packet to a terminal on the first DRB; and
after sending the PDCP layer data packet to the terminal on the first DRB, sending, by the first access network device, to the terminal on the first DRB, a data packet received from a core network.

13. The method according to claim 12, wherein a mapping relationship between a flow and the DRB of the second access network device is the same as a mapping relationship between the flow and the first DRB.

14. The method according to claim 12, wherein the first DRB and the DRB of the second access network device have a same PDCP sequence number SN status and a same hyper frame number (HFN) status.

15. The method according to claim 13, further comprising:
receiving, by the first access network device, the mapping relationship between the flow and the DRB of the second access network device from the second access network device.

16. The method according to claim 12, further comprising:
receiving, by the first access network device, data packets of a flow from the terminal on the first DRB and a second DRB; and
after receiving an end marker from the terminal on the first DRB, sending; by the first access network device, one or more data packets of the flow received on the second DRB to the core network.

17. A communication apparatus, comprising at least one processor coupled with a non-transitory storage medium storing instructions that, when executed by the at least one processor, cause an access network device to:

establish, a data radio bearer (DRB)-based tunnel and a session-based tunnel with a second access network device; and receive, forwarded data packets from the second access network device via the DRB-based tunnel and the session-based tunnel;

wherein the DRB-based tunnel is used to receive a Packet Data Convergence Protocol (PDCP) layer data packet from the second access network device; and wherein the session-based tunnel is used to receive a Service Data Adaptation Protocol (SDAP) layer data packet from the second access network device; and the instructions when executed by the at least one processor, further causing the access network device to:

map a PDCP layer data packet on a DRB of the second access network device to a first DRB which is corresponding to the DRB of the second access network device;

send the PDCP layer data packet to a terminal on the first DRB; and after sending the PDCP layer data packet to the terminal on the first DRB, send to the terminal on the first DRB, a data packet received from a core network.

18. The communication apparatus according to claim 17, wherein a mapping relationship between a flow and the DRB of the second access network device is the same as a mapping relationship between the flow and the first DRB.

19. The communication apparatus according to claim 17, wherein the first DRB and the DRB of the second access network device have a same PDCP sequence number (SN) status and a same hyper frame number (HFN) status.

20. The communication apparatus according to claim 18, the instructions when executed by the at least one processor, further causing the access network device to:

receive the mapping relationship between the flow and the DRB of the second access network device from the second access network device.

21. The communication apparatus according to claim 17, the instructions when executed by the at least one processor, further causing the access network device to:

receive data packets of a flow from the terminal on the first DRB and a second DRB; and after receiving an end marker from the terminal on the first DRB, send one or more data packets of the flow received on the second DRB to the core network.

22. The communication apparatus according to claim 17, wherein:

the access network device is a target access network device, and the second access network device is a source access network device; or the access network device is a master base station, and the second access network device is a secondary base station, both the master base station and the secondary base station connecting to a terminal; or the access network device is a secondary base station, and the second access network device is a master base station, both the master base station and the secondary base station connecting to a terminal.

* * * * *

UNITED STATES PATENT AND TRADEMARK OFFICE
CERTIFICATE OF CORRECTION

PATENT NO. : 10,785,825 B2
APPLICATION NO. : 16/581151
DATED : September 22, 2020
INVENTOR(S) : Lifeng Han, Qufang Huang and Mingzeng Dai Page 1 of 1

It is certified that error appears in the above-identified patent and that said Letters Patent is hereby corrected as shown below:

In the Claims

In Column 44, Line 61, in Claim 16, delete "sending;" and insert -- sending, --, therefor.

Signed and Sealed this
Twenty-ninth Day of December, 2020

Andrei Iancu
*Director of the United States Patent and Trademark Office*